United States Patent
Sera et al.

(10) Patent No.: US 11,462,767 B2
(45) Date of Patent: Oct. 4, 2022

(54) ELECTROCHEMICAL DEVICE ELECTRODE. METHOD FOR PRODUCING ELECTROCHEMICAL DEVICE ELECTRODE AND ELECTROCHEMICAL DEVICE

(71) Applicant: HITACHI CHEMICAL COMPANY, LTD., Tokyo (JP)

(72) Inventors: Yusuke Sera, Tokyo (JP); Hideyuki Ogawa, Tokyo (JP); Hiroki Mikuni, Tokyo (JP)

(73) Assignee: SHOWA DENKO MATERIALS CO., LTD., Tokyo (JP)

(*) Notice: Subject to any disclaimer, the term of this patent is extended or adjusted under 35 U.S.C. 154(b) by 180 days.

(21) Appl. No.: 16/606,334

(22) PCT Filed: Apr. 20, 2018

(86) PCT No.: PCT/JP2018/016318
§ 371 (c)(1),
(2) Date: Oct. 18, 2019

(87) PCT Pub. No.: WO2018/194159
PCT Pub. Date: Oct. 25, 2018

(65) Prior Publication Data
US 2020/0136181 A1  Apr. 30, 2020

(30) Foreign Application Priority Data

Apr. 21, 2017 (WO) .................. PCT/JP2017/016079
Apr. 21, 2017 (WO) .................. PCT/JP2017/016084

(51) Int. Cl.
*H01M 10/0565* (2010.01)
*H01M 4/136* (2010.01)
*H01M 4/62* (2006.01)
*H01M 10/058* (2010.01)

(52) U.S. Cl.
CPC ....... *H01M 10/0565* (2013.01); *H01M 4/136* (2013.01); *H01M 4/62* (2013.01); *H01M 10/058* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 6,395,419 B1 | 5/2002 | Kuwahara et al. | |
| 2005/0221188 A1 | 10/2005 | Takami et al. | |
| 2008/0160324 A1* | 7/2008 | Ohmori | H01M 8/1246 428/454 |
| 2010/0075222 A1 | 3/2010 | Watanabe | |
| 2012/0301794 A1 | 11/2012 | Koh et al. | |
| 2013/0106029 A1 | 5/2013 | Snyder et al. | |
| 2015/0079485 A1 | 3/2015 | Choi et al. | |
| 2015/0155566 A1 | 6/2015 | Kim et al. | |
| 2015/0340168 A1* | 11/2015 | Kwon | H01G 11/30 361/502 |
| 2016/0149224 A1 | 5/2016 | Okuno et al. | |
| 2016/0181658 A1* | 6/2016 | Kim | H01M 10/0569 429/200 |
| 2017/0018802 A1 | 1/2017 | Omoda et al. | |
| 2018/0277897 A1 | 9/2018 | Sugita et al. | |
| 2021/0111430 A1* | 4/2021 | Ogawa | C08K 5/435 |
| 2021/0135275 A1* | 5/2021 | Ogawa | C08L 79/04 |

FOREIGN PATENT DOCUMENTS

| | | |
|---|---|---|
| CN | 101162791 A | 4/2008 |
| CN | 102522589 A1 | 6/2012 |
| CN | 102754267 A | 10/2012 |
| CN | 103329335 A | 9/2013 |
| CN | 110537274 A | 12/2019 |
| EP | 1619742 A | 1/2006 |
| EP | 2415793 A1 | 2/2012 |
| EP | 3279973 A1 | 2/2018 |

(Continued)

OTHER PUBLICATIONS

Machine translation JP 2013-214510, published on Oct. 17, 2013 (Year: 2013).*

Kaiya Koji, "High School Course TV Learning Memo: Molecular Polarity", online, NHK accessed on Feb. 14, 2020 https://www.nhk.or.jp/kokokoza/library/tv/kagakukiso/, Oct. 2019 (cited in an office action in counterpart JP Patent Application No. P2019-510989 dated Feb. 20, 2020).

Oeda Kazunari, "Properties of Teflon® Fluorine Resin", online,Packing Land Co., Ltd. accessed on Feb. 14, 2020 URL: https://www.packing.co.jp/PTFE/ptfe_tokusei1.htm, Oct. 2006 (cited in an office action in counterpart JP Patent Application No. P2019-510989 dated Feb. 20, 2020).

Brinkkötter et al., "Influence of anion structure on ion dynamics in polymer gel electrolytes composed of poly(ionic liquid), ionic liquid and Li salt", Electrochimica Acta, 237, May 2017, p. 237-p. 247 (cited in an office action dated Apr. 26, 2021 in U.S. Appl. No. 16/606,493).

(Continued)

*Primary Examiner* — Anca Eoff
(74) *Attorney, Agent, or Firm* — Fitch, Even, Tabin & Flannery, L.L.P.

(57) ABSTRACT

Disclosed is an electrochemical device electrode comprising an electrode current collector and an electrode mixture layer provided on at least one principal surface of the electrode current collector, wherein the electrode mixture layer comprises an electrode active material, a polymer having a structural unit represented by the following formula (1), at least one electrolyte salt selected from the group consisting of lithium salts, sodium salts, calcium salts, and magnesium salts, and a molten salt having a melting point of 250° C. or less:

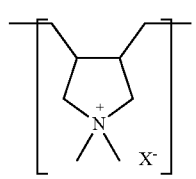

(1)

wherein X⁻ represents a counter anion.

12 Claims, 10 Drawing Sheets

(56) References Cited

FOREIGN PATENT DOCUMENTS

| JP | H11-162513 | A | | 6/1999 |
|---|---|---|---|---|
| JP | 2000-090728 | A | | 3/2000 |
| JP | 2000-164254 | A | | 6/2000 |
| JP | 2003-077539 | A | | 3/2003 |
| JP | 2008-53135 | A | | 3/2003 |
| JP | 2006-032237 | A | | 2/2006 |
| JP | 2006-049158 | A | | 2/2006 |
| JP | 2006-120517 | A | | 5/2006 |
| JP | 2006-294326 | A | | 10/2006 |
| JP | 2007-141467 | A | | 6/2007 |
| JP | 2008-243736 | A | | 10/2008 |
| JP | 2010-153375 | A | | 7/2010 |
| JP | 2011-054519 | | | 3/2011 |
| JP | 2011-070793 | A | | 4/2011 |
| JP | 2011-108499 | A | | 6/2011 |
| JP | 2011-129400 | A | | 6/2011 |
| JP | 2012-518248 | A | | 8/2012 |
| JP | 2013-19154 | A | | 1/2013 |
| JP | 2013-191547 | A | | 9/2013 |
| JP | 2013-214510 | | * | 10/2013 |
| JP | 2014-007258 | A | | 1/2014 |
| WO | 99/040025 | A1 | | 8/1999 |
| WO | 2011/037060 | A1 | | 3/2011 |
| WO | 2015/068324 | A1 | | 5/2015 |
| WO | 2015/097952 | A1 | | 7/2015 |
| WO | 2017/047015 | A1 | | 3/2017 |

OTHER PUBLICATIONS

Safa et al., "Polymeric Ionic Liquid Gel Electrolyte for Room Temperature Lithium Battery Applications", Electrochimica Acta,213, Sep. 2016, p. 587-p. 593 (cited in an office action dated Apr. 26, 2021 in U.S. Appl. No. 16/606,493).

Li et al., "Polymeric ionic liquid-ionic plastic crystal all-solid-state electrolytes for wide operating temperature range lithium metal batteries", Journal of Materials Chemistry A,5, Sep. 2017, p. 21362-p. 21369 (cited in an office action dated Apr. 26, 2021 in U.S. Appl. No. 16/606,493).

Yoshizawa-Fujita et al., "A Plastic Elecrtolyte Material in a Highly Desirable Temprature Range: N-Ethyl-N-methylpyrrolidinium Bis(fluorosulfonyl)amide", Chemistry Letters, 2014; vol. 43, p. 1909-p. 1911 (cited in an office action dated Aug. 27, 2021 in U.S. Appl. No. 16/606,493).

G.B. .Appetecchi et al., "Ternary polymer electrolytes containing pyrrolidinium-based polymeric ionicliquids for lithium batteries", Journal of Power Sources vol. 195(11), 2010, p. 3668-p. 3675 (cited in ISRs of Appln. No. PCT/JP2018/016318 dated Jun. 12, 2018 and PCT/JP2017/016079 dated Jul. 4, 2017).

Anne-Laure Pont et al., "Pyrrolidinium-based polymeric ionic liquids as mechanically andelectrochemicaily stable polymer electrolytes", Journal of Power Sources vol. 188 (2), 2009, p. 558-p. 563 (cited in ISRs of Appln. No. PCT/JP2018/016318 dated Jun. 12, 2018 and PCT/JP2017/016079 dated Jul. 4, 2017, and in specification of copending U.S. Appl. No. 16/606,273).

P. Hovington et al., "New Lithium Metal Polymer Solid State Battery for an Ultrahigh Energy: Nano C-LiFePO4 versus Nano Li1.2V3O8", Nano Letters, 2015, 15(4), p. 2671-p. 2678 (cited in specification of copending U.S. Appl. No. 16/606,493).

Bhandary Rajesh el al, "Polymer effect on lithium ion dynamics in gel polymer electrolytes: Cationic versus acrylate polymer", Electrochimica Acta, Elsevier, Amsterdam, NL, vol. 174, Jun. 11, 2015, p. 753-p. 761, XP029250951 (cited in a Search Report in counterpart EP Patent Application No. 17906396.1 dated Oct. 28, 2020).

Ruisi Zhang et al., "Ionic Liquid-Doped Gel Polymer Electrolyte for Flexible Lithium-Ion Polymer Batteries," Materials, 8, 2735-2748, published May 20, 2015; 14 pages (Cited in Office Action dated Nov. 24, 2021 in U.S. Appl. No. 16/617,048).

Yungdong Zhou, et al., "N-ethy-N-methylpyrrolidinium bis(fluorosulfonyl)imide-electrospun polyvinylidene fluoride composite electrolytes: characterization and lithium cell studies," Royal Society of Chemistry, Phys. Chem. Chem. Phys., vol. 19, 2017 (accepted: Dec. 19, 2016) pp. 2225-2234 (Cited in Office Action dated Aug. 18, 2022, for Chinese Application No. 201780089690.4).

* cited by examiner

Fig.3
(a)
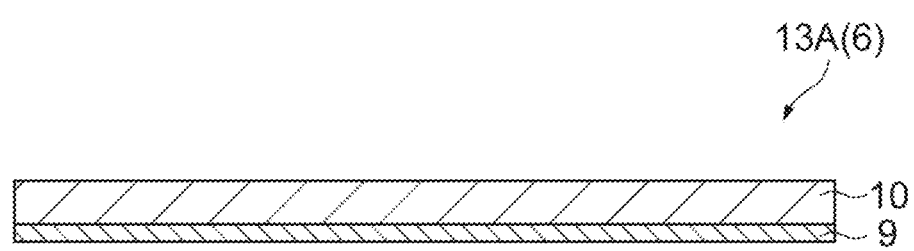
(b)
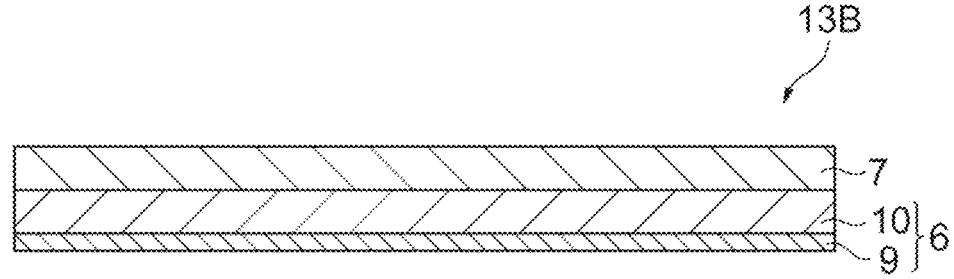

Fig.4
(a)
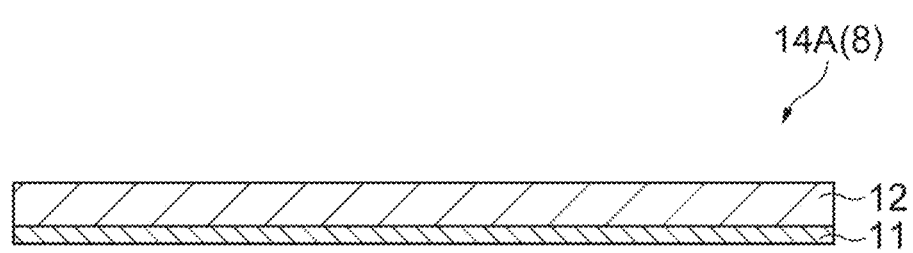
(b)
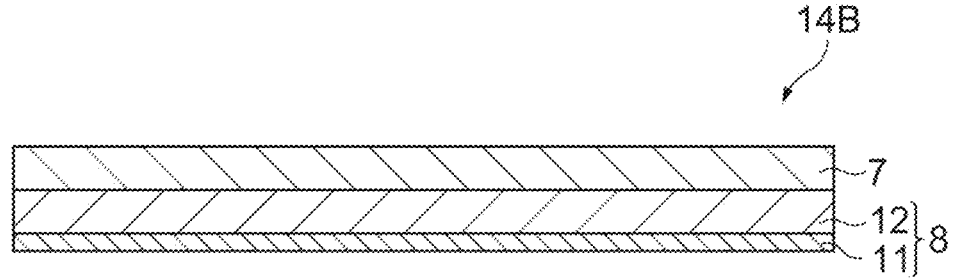

Fig.6
(a)
(b)
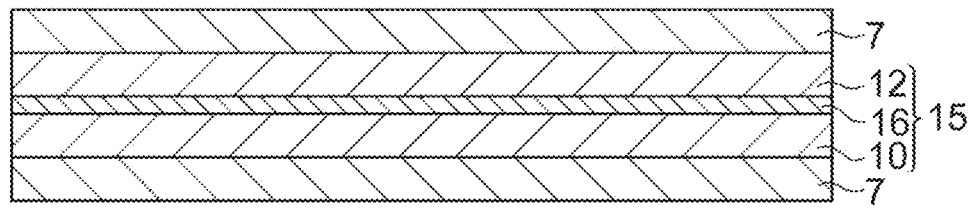

Fig.7
(a)
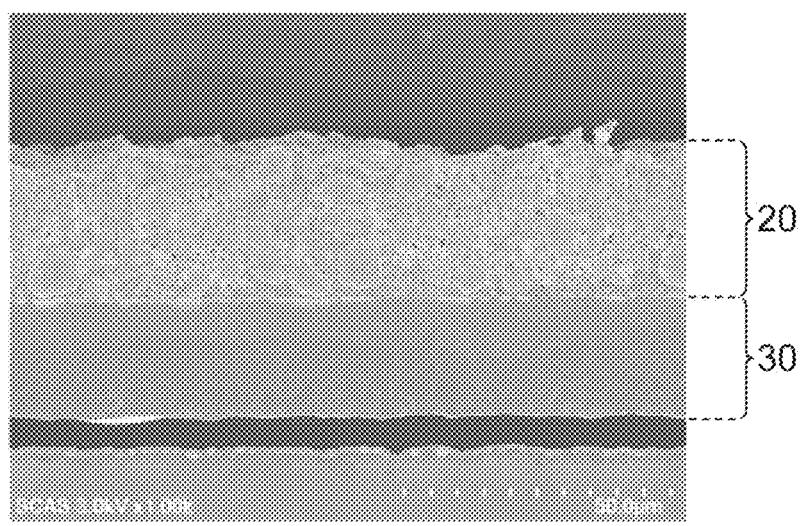
(b)
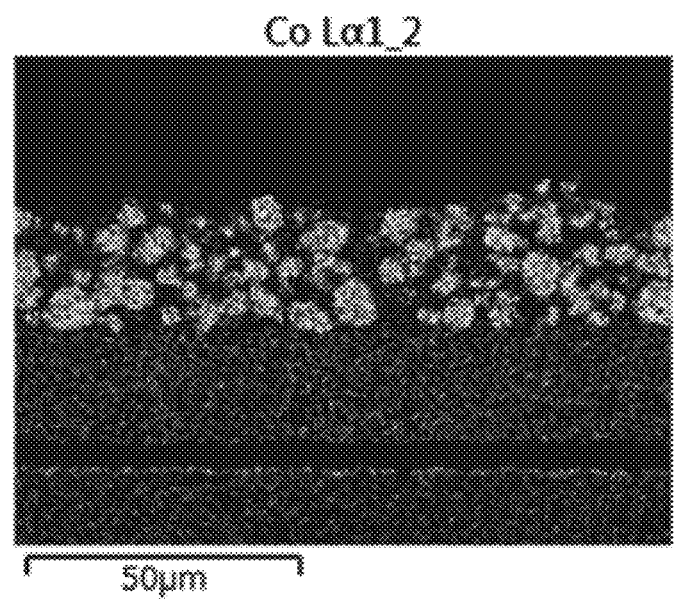
(c)
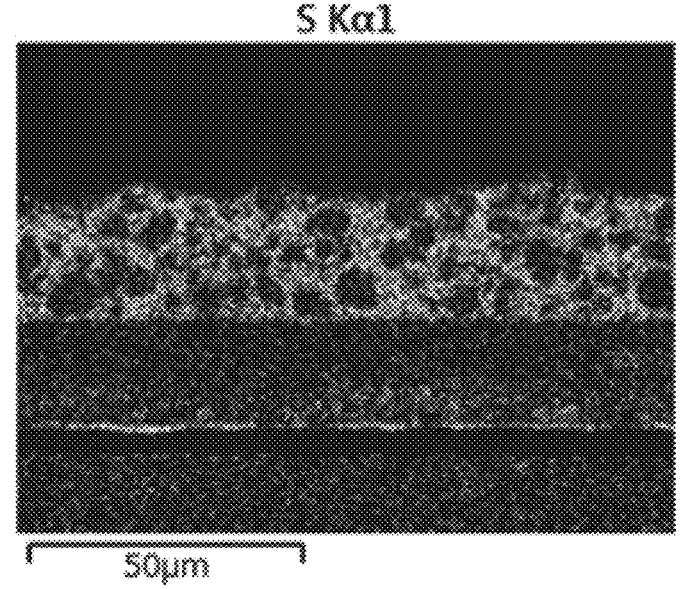

Fig.9
(a)
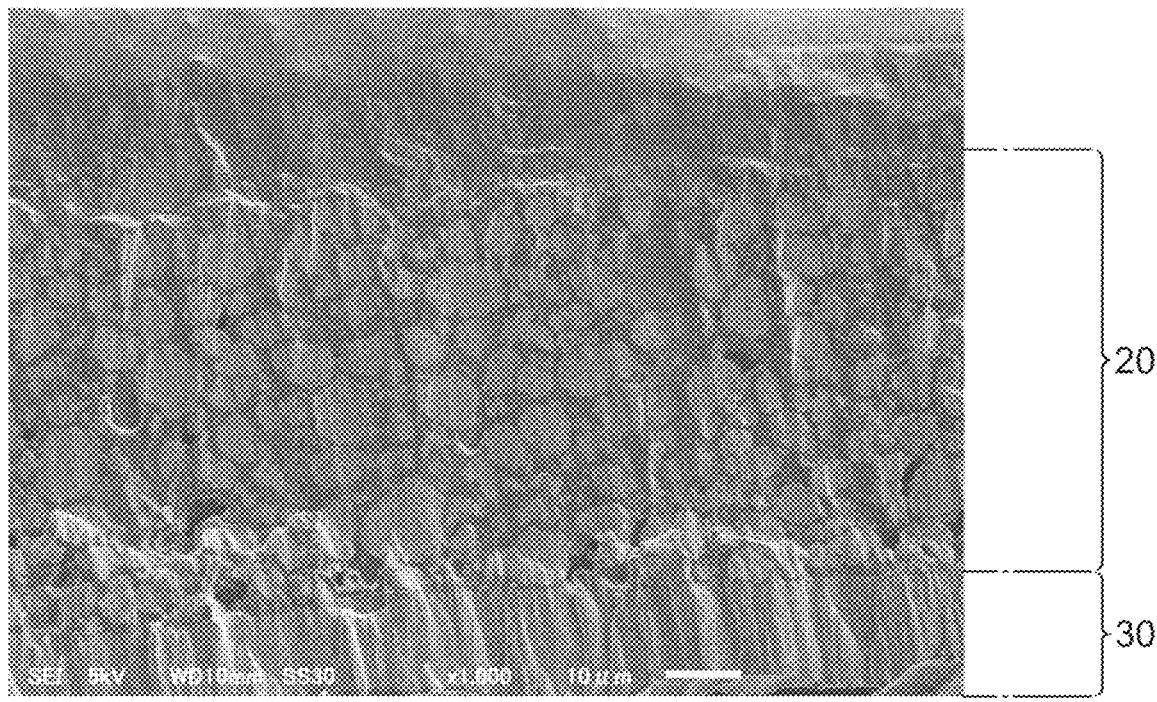
(b)
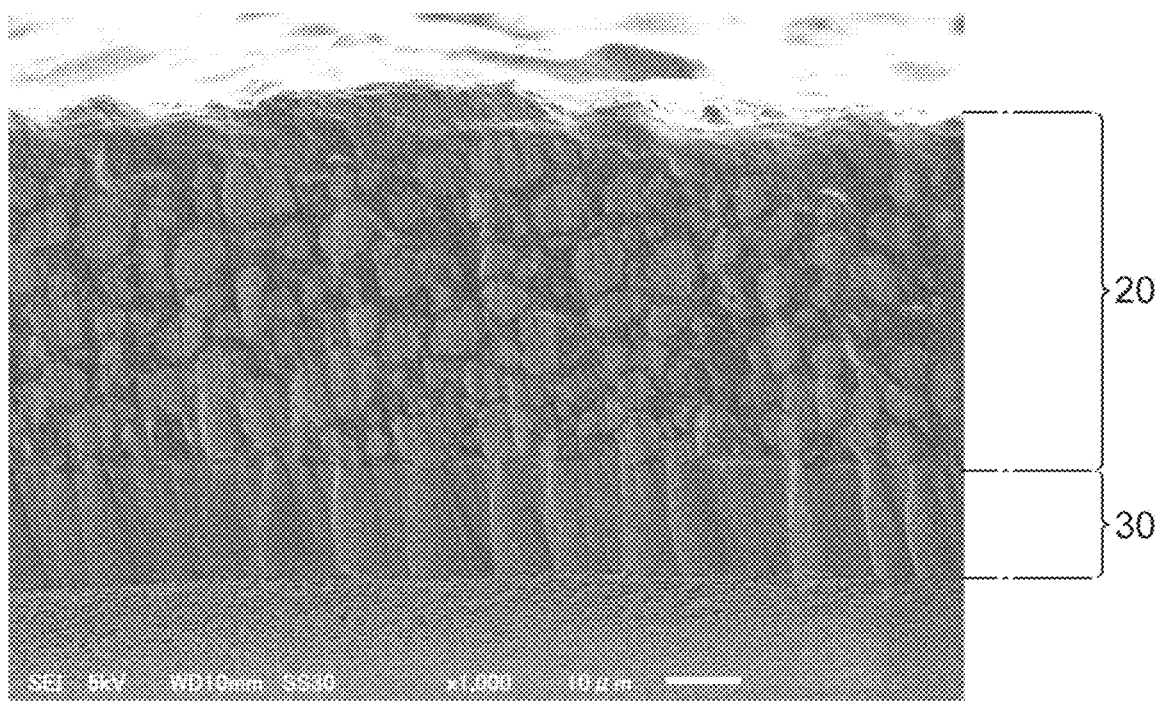

Fig.10
(a)
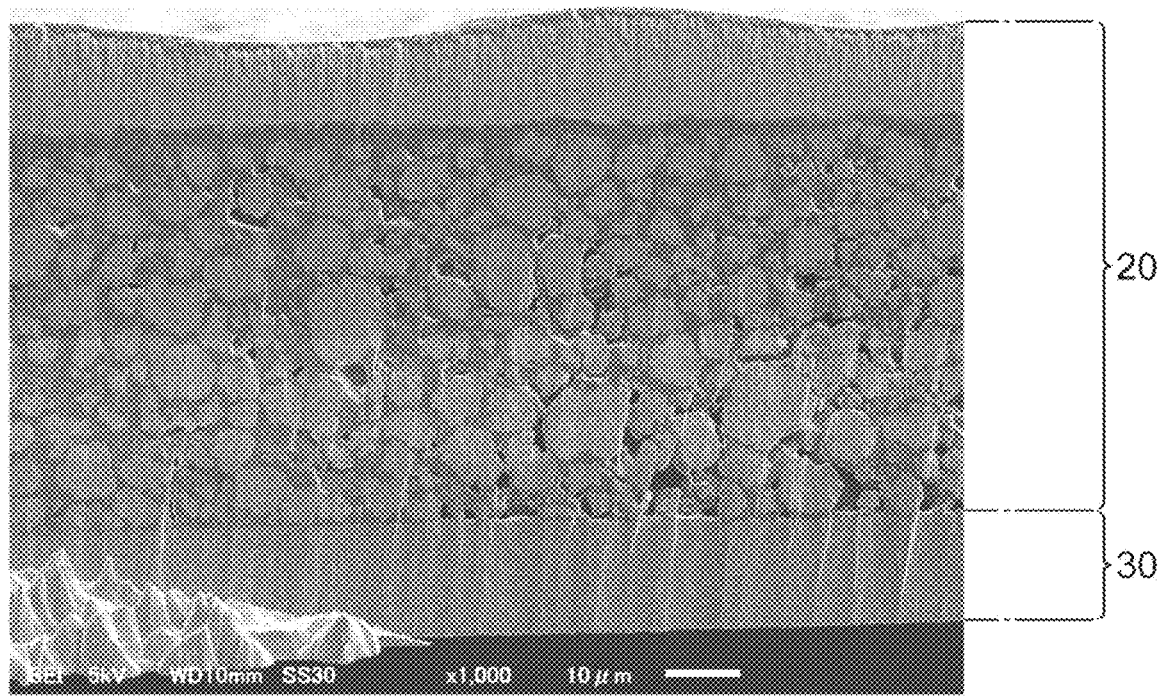
(b)
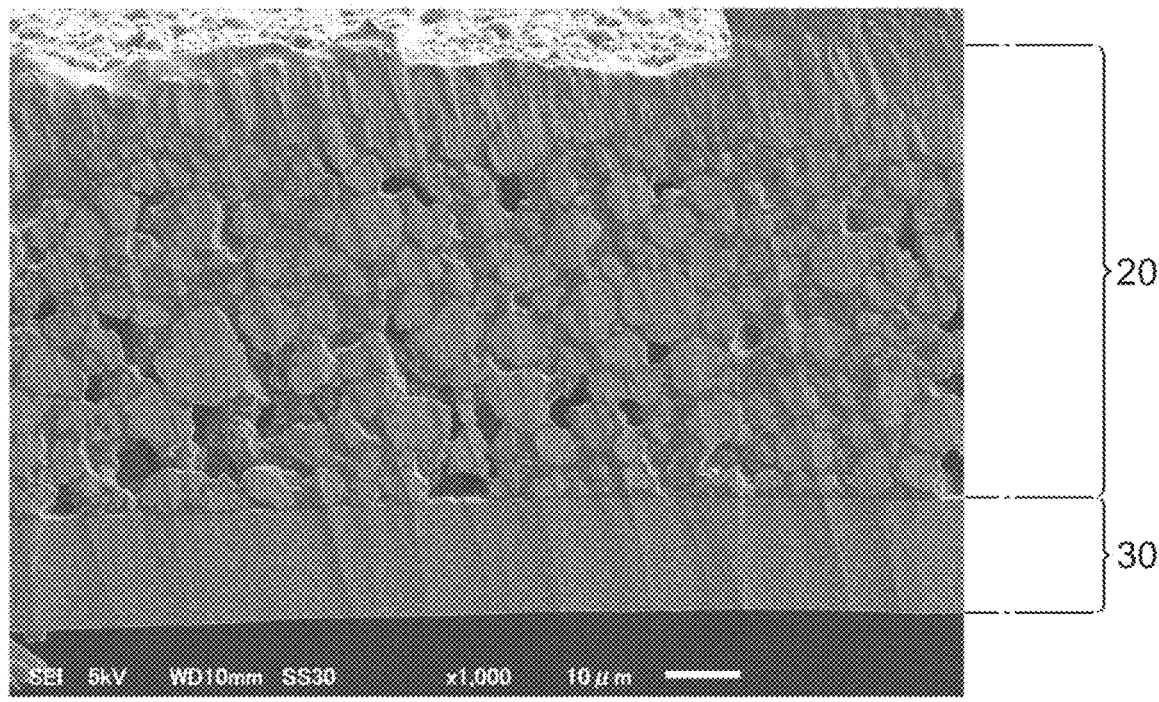

ELECTROCHEMICAL DEVICE ELECTRODE. METHOD FOR PRODUCING ELECTROCHEMICAL DEVICE ELECTRODE AND ELECTROCHEMICAL DEVICE

CROSS-REFERENCE TO RELATED APPLICATIONS

This application is a U.S. national phase application filed under 35 U.S.C. § 371 of International Application No. PCT/JP2018/016318, filed Apr. 20, 2018, designating the United States, which claims priority from International Application No. PCT/JP2017/016079, filed Apr. 21, 2017, and International Application No. PCT/JP2017/016084, filed Apr. 21, 2017, which are hereby incorporated herein by reference in their entirety.

TECHNICAL FIELD

The present invention relates to an electrochemical device electrode, a production method therefor, an electrochemical device, and a polymer electrolyte composition.

BACKGROUND ART

Lithium ion secondary batteries, which are energy devices having a high energy density, have been used as power sources for portable devices such as notebook computers and mobile phones, electric vehicles, and the like, with their characteristics taken advantage of.

In lithium ion secondary batteries predominantly used now, a separator is sandwiched between a positive electrode and a negative electrode, and the separator is impregnated with an organic electrolyte solution. In such a lithium ion secondary battery, there is a possibility of ignition when an abnormality occurs and the temperature of the battery rises because the organic electrolyte solution is flammable. In lithium ion secondary batteries, in order to start achieving a higher energy density and enlargement, it is important to enhance the safety, and it is required that circumstances such as ignition be avoided in the configuration of the lithium ion secondary batteries.

From this fact, development of lithium ion secondary batteries of a configuration in which an organic electrolyte solution that may cause ignition and the like is not used has proceeded. In particular, development of solid electrolytes has been actively made. However, when a solid electrolyte is employed as an electrolyte layer, an interface between the solid electrolyte and an electrode active material comprised in an electrode mixture layer is unlikely to be formed due to the low fluidity of the solid electrolyte. As one of measures to solve this, enhancing the ionic conductivity of the electrode mixture layer has been investigated.

For example, a method for adding an inorganic solid electrolyte to an electrode mixture layer in a lithium ion battery is disclosed in Patent Literature 1.

CITATION LIST

Patent Literature

Patent Literature 1: JP No. 2013-191547

SUMMARY OF INVENTION

Technical Problem

However, the inorganic solid electrolyte used in the method described in Patent Literature 1 is poor in flexibility, and it is difficult for the electrolyte to change its shape to conform to the shape of voids inside the electrode mixture layer in the positive electrode and the negative electrode. Thus, desired characteristics of batteries may not be obtained. When the amount of the inorganic solid electrolyte added is increased in order to enhance the interface formability, the ratio of the electrode active material in the electrodes relatively decreases, and thus, the battery characteristics tends to decrease.

The present invention has been made in consideration of the situation described above, and it is an object thereof to provide an electrochemical device electrode, which is capable of enhancing the battery characteristics, even when the battery is produced with addition of a solid electrolyte to an electrode mixture layer, and to provide a production method therefor. It is another object of the present invention to provide an electrochemical device in which such an electrochemical device electrode is employed. It is still another object of the present invention to provide a polymer electrolyte composition capable of improving the ionic conductivity of an electrode mixture layer.

Solution to Problem

A first aspect of the present invention is an electrochemical device electrode comprising an electrode current collector and an electrode mixture layer provided on at least one principal surface of the electrode current collector, wherein the electrode mixture layer comprises an electrode active material, a polymer having a structural unit represented by the following formula (1) (hereinbelow, may be simply referred to as the "polymer"), at least one electrolyte salt selected from the group consisting of lithium salts, sodium salts, calcium salts, and magnesium salts (hereinbelow, may be simply referred to as the "electrolyte salt"), and a molten salt having a melting point of 250° C. or less (hereinbelow, may be simply referred to as the "molten salt"):

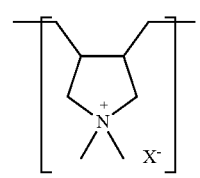

(1)

wherein $X^-$ represents a counter anion.

According to the electrochemical device electrode of the first aspect of the present invention, a good interface is formed between the electrode active material and the polymer in the electrode mixture layer, and thus, it is possible to improve the battery characteristics even when a battery is produced with addition of a solid electrolyte to the electrode mixture layer.

The anion of the electrolyte salt may be at least one selected from the group consisting of $PF_6^-$, $BF_4^-$, $N(FSO_2)_2^-$, $N(CF_3SO_2)_2^-$, $B(C_2O_4)_2^-$, and $ClO_4^-$. The electrolyte salt may be a lithium salt.

The content of the molten salt may be 10 to 80% by mass based on the total amount of the polymer, the electrolyte salt, and the molten salt.

The electrochemical device electrode may be a positive electrode. That is, the electrode current collector may be a positive electrode current collector, the electrode mixture layer may be a positive electrode mixture layer, and the electrode active material may be a positive electrode active material.

The electrochemical device electrode may be a negative electrode. That is, the electrode current collector may be a negative electrode current collector, the electrode mixture layer may be a negative electrode mixture layer, and the electrode active material may be a negative electrode active material. The negative electrode active material may comprise graphite. When the negative electrode active material comprises graphite, it is preferred that the electrolyte salt comprise LiN(FSO$_2$)$_2$.

A second aspect of the present invention is an electrochemical device comprising the electrochemical device electrode mentioned above. The electrochemical device may be a secondary battery.

A third aspect of the present invention is a method for producing an electrochemical device electrode, the method comprising a step of providing an electrode precursor in which an electrode active material layer comprising an electrode active material is provided on at least one principal surface of an electrode current collector, a step of adding a slurry comprising a polymer having a structural unit represented by the following formula (1), at least one electrolyte salt selected from the group consisting of lithium salts, sodium salts, calcium salts, and magnesium salts, a molten salt having a melting point of 250° C. or less, and a dispersion medium to the electrode active material layer of the electrode precursor, and a step of removing a volatile component from the slurry added to the electrode active material layer to form an electrode mixture layer:

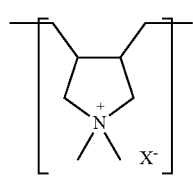

(1)

wherein X$^-$ represents a counter anion.

The anion of the electrolyte salt may be at least one selected from the group consisting of PF$_6^-$, BF$_4^-$, N(FSO$_2$)$_2^-$, N(CF$_3$SO$_2$)$_2^-$, B(C$_2$O$_4$)$_2^-$, and ClO$_4^-$.

The content of the molten salt may be 10 to 80% by mass based on the total amount of the polymer, the electrolyte salt, and the molten salt.

The dispersion medium may comprise acetone. The mass ratio of the content of the dispersion medium to the content of the polymer ("content of the dispersion medium"/"content of the polymer") may be 6 or less.

A fourth aspect of the present invention is a polymer electrolyte composition comprising a polymer having a structural unit represented by the following formula (1), at least one electrolyte salt selected from the group consisting of lithium salts, sodium salts, calcium salts, and magnesium salts, and a molten salt having a melting point of 250° C. or less:

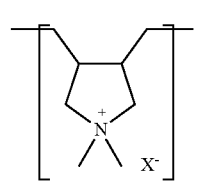

(1)

wherein X$^-$ represents a counter anion.

The anion of the electrolyte salt may be at least one selected from the group consisting of PF$_6^-$, BF$_4^-$, N(FSO$_2$)$_2^-$, N(CF$_3$SO$_2$)$_2$, B(C$_2$O$_4$)$_2^-$, and ClO$_4$–. The electrolyte salt may be a lithium salt.

The content of the molten salt may be 10 to 80% by mass based on the total amount of the polymer, the electrolyte salt, and the molten salt.

The polymer electrolyte composition may further comprise a dispersion medium. The dispersion medium may comprise acetone. The mass ratio of the content of the dispersion medium to the content of the polymer may be 6 or less.

Advantageous Effects of Invention

According to the present invention, an electrochemical device electrode, which is capable of improving the battery characteristics even when a battery is produced with addition of a solid electrolyte to an electrode mixture layer, and a production method therefor are provided. Also, according to the present invention, an electrochemical device in which such an electrochemical device electrode is employed is provided. Further, according to the present invention, a polymer electrolyte composition capable of improving the ionic conductivity of an electrode mixture layer is provided.

BRIEF DESCRIPTION OF DRAWINGS

FIG. 3(a) is a cross sectional view taken along line I-I of FIG. 2 for describing an electrochemical device electrode (positive electrode) according to one embodiment; FIG. 3(b) is a schematic cross sectional view showing an electrochemical device electrode (positive electrode) according to another embodiment;

FIG. 4(a) is a cross sectional view taken along line II-II of FIG. 2 for describing an electrochemical device electrode (negative electrode) according to one embodiment; FIG. 4(b) is a schematic cross sectional view showing an electrochemical device electrode (negative electrode) according to another embodiment;

FIG. 6(a) is a cross sectional view taken along line III-III of FIG. 5 for describing an electrochemical device electrode (bipolar electrode) according to another embodiment; FIG. 6(b) is a schematic cross sectional view showing an electrochemical device electrode (bipolar electrode) according to another embodiment;

FIG. 7(a) is a scanning electron microscope image of a positive electrode produced in Example 1-1; FIG. 7(b) is an image showing the cobalt distribution, obtained by energy dispersive X-ray analysis, in the positive electrode shown in FIG. 7(a); FIG. 7(c) is an image showing the sulfur distribution, obtained by energy dispersive X-ray analysis, in the positive electrode shown in FIG. 7(a);

FIG. 9(a) is a scanning electron microscope image of a positive electrode produced in Example 3-1; FIG. 9(b) is a scanning electron microscope image of a positive electrode produced in Example 3-2; and FIG. 10(a) is a scanning electron microscope image of a positive electrode produced in Example 3-3; FIG. 10(b) is a scanning electron microscope image of a positive electrode produced in Example 3-4.

DESCRIPTION OF EMBODIMENTS

Hereinbelow, embodiments of the present invention will be described with reference to the drawings. However, the present invention is not intended to be limited to the following embodiments. In the following embodiments, their components (including steps) are not essential unless otherwise explicitly stated. Dimensions of the components in each drawing are imaginary, and the relative relationship of the dimension between the components is not limited to those shown in each drawing.

The same shall apply to numerical values and numerical ranges herein, which do not limit the present invention. Each numerical range specified using "to" herein represents a range including the numerical values indicated before and after "to" as the minimum value and the maximum value, respectively. In the numerical ranges described stepwisely herein, the upper limit or lower limit described in one numerical range may be replaced by the upper limit or lower limit of another numerical range described stepwisely. Also in the numerical ranges described herein, the upper limit or lower limit of the numerical ranges may be replaced by a value shown in Examples.

Herein, an "electrode" means a positive electrode or a negative electrode. The same is applied to other similar expressions such as an electrode current collector, an electrode mixture layer, an electrode active material, an electrode active material layer, and an electrode precursor.

Herein, as abbreviations, the following may be used.
[EMI]$^+$: 1-ethyl-3-methylimidazolium cation
[DEME]$^+$: N,N-diethyl-N-methyl-N-(2-methoxyethyl)ammonium cation
[Py12]$^+$: N-ethyl-N-methylpyrrolidinium cation
[Py13]$^+$: N-methyl-N-propylpyrrolidinium cation
[PP13]$^+$: N-methyl-N-propylpiperidinium cation
[FSI]$^-$: bis(fluorosulfonyl)imide anion
[TFSI]$^-$: bis(trifluoromethanesulfonyl)imide anion
[f3C]$^-$: tris(fluorosulfonyl)carbanion
[BOB]$^-$: bis oxalate borate anion
[P(DADMA)][Cl]: poly(diallyldimethylammonium)chloride
[P(DADMA)] [TFSI]: poly(diallyldimethylammonium)bis(trifluoromethanesulfonyl)imide

[First Aspect (Electrochemical Device Electrode), Second Aspect (Electrochemical Device), and Third Aspect (Method for Producing Electrochemical Device Electrode)]

Figure 1:
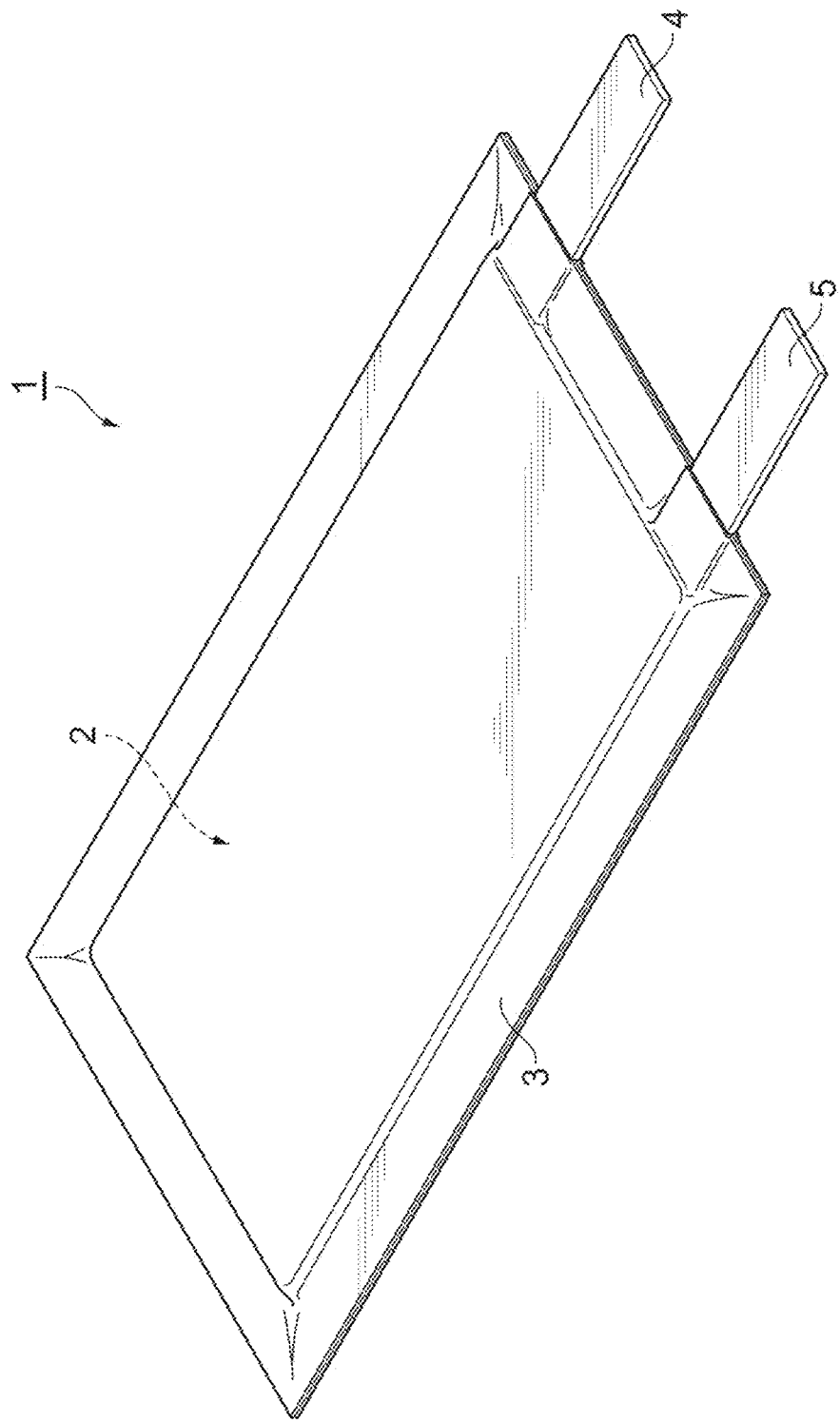
FIG. 1 is a perspective view showing an electrochemical device according to First Embodiment.

FIG. 1 is a perspective view showing an electrochemical device according to First Embodiment. The electrochemical device may be a secondary battery. Hereinbelow, an aspect of the secondary battery will be described.

As shown in FIG. 1, a secondary battery 1 comprises an electrode group 2 composed of an electrochemical device electrode and an electrolyte layer, and a bag-like battery outer packaging 3 to accommodate the electrode group 2. The electrochemical device electrode may be a positive electrode or may be a negative electrode. A positive electrode collector tab 4 and a negative electrode collector tab 5 are provided respectively on the electrochemical device electrodes (positive electrode and negative electrode). The positive electrode collector tab 4 and the negative electrode collector tab 5 protrude from the inside of the battery outer packaging 3 to the outside such that the positive electrode and the negative electrode can each electrically connect to the outside of the secondary battery 1.

The battery outer packaging 3 may be formed with a laminate film, for example. The laminate film may be a layered film in which, for example, a resin film such as a polyethylene terephthalate (PET) film, a foil of metal such as aluminum, copper, and stainless steel, and a sealant layer such as polypropylene are layered in this order.

Figure 2:
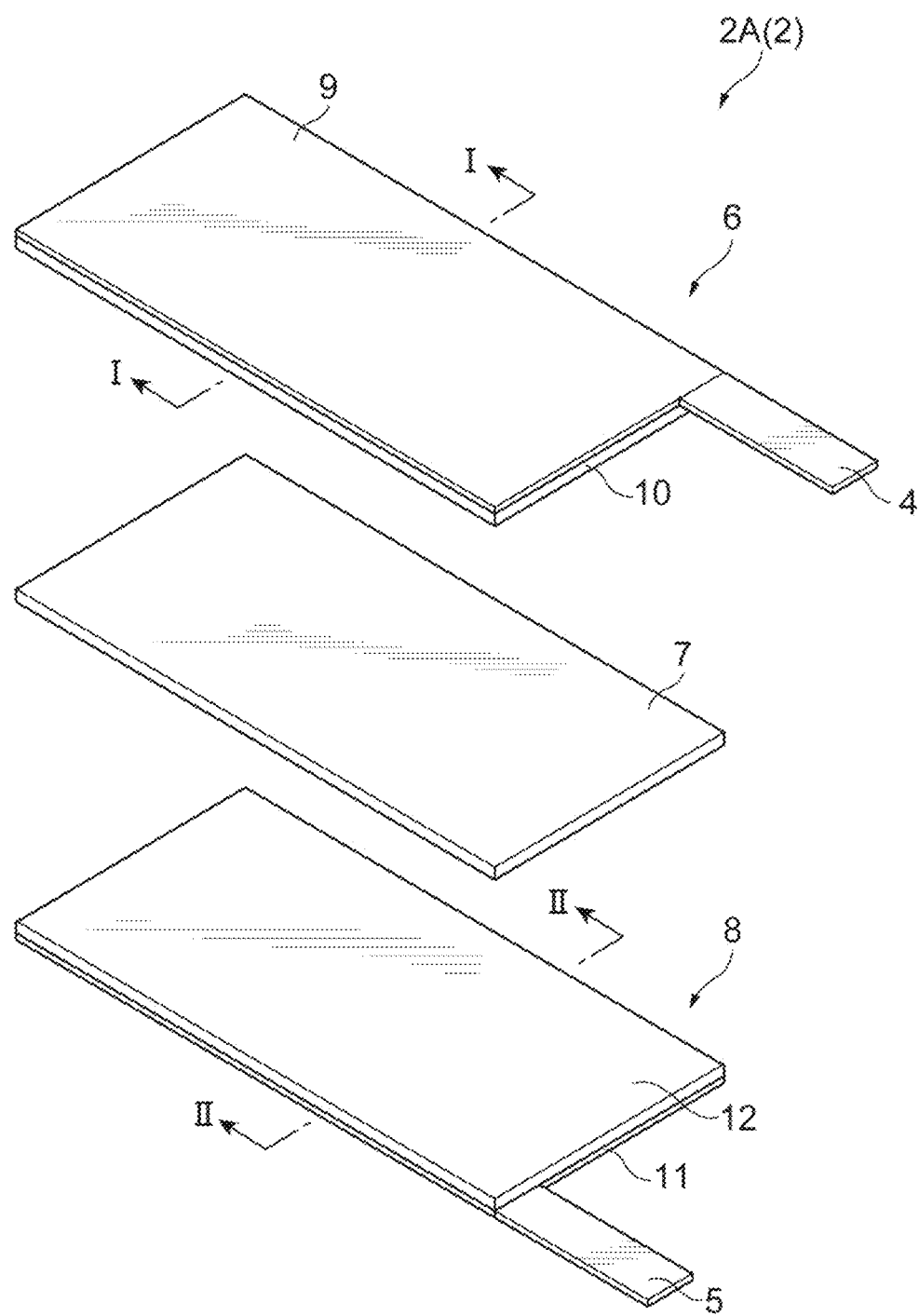
FIG. 2 is an exploded perspective view showing an electrode group of the electrochemical device shown in FIG. 1.

FIG. 2 is an exploded perspective view showing one embodiment of the electrode group 2 in the secondary battery 1 shown in FIG. 1. As shown in FIG. 2, an electrode group 2A comprises a positive electrode 6, an electrolyte layer 7, and a negative electrode 8 in this order. The positive electrode 6 comprises a positive electrode current collector 9 and a positive electrode mixture layer 10 provided on at least one principal surface of the positive electrode current collector 9. On the positive electrode current collector 9, a positive electrode collector tab 4 is provided. The negative electrode 8 comprises a negative electrode current collector 11 and a negative electrode mixture layer 12 provided on at least one principal surface of the negative electrode current collector 11. On the negative electrode current collector 11, a negative electrode collector tab 5 is provided.

FIG. 3(a) is a cross sectional view taken along line I-I of FIG. 2. A positive electrode 6 (first electrochemical device electrode 13A) comprises a positive electrode current collector 9 and a positive electrode mixture layer 10 provided on at least one principal surface of the positive electrode current collector 9, as shown in FIG. 3(a).

FIG. 3(b) is a schematic cross sectional view showing a first electrochemical device electrode according to another embodiment. As shown in FIG. 3(b), a first electrochemical device electrode 13B comprises a positive electrode current collector 9, a positive electrode mixture layer 10, and an electrolyte layer 7 in this order.

The first electrochemical device electrode 13A comprises the positive electrode current collector 9. The positive electrode current collector 9 may be formed with aluminum, stainless steel, titanium or the like. The positive electrode current collector 9 may be specifically, for example, an aluminum perforated foil having pores of which pore diameter is 0.1 to 10 mm, an expanded metal, a foamed metal sheet or the like. The positive electrode current collector 9 may be formed with any material other than those described above as long as the material is not subject to change such as dissolution and oxidation during use of the battery, and additionally, its shape and production method are not limited.

The thickness of the positive electrode current collector 9 may be 1 μm or more, 5 μm or more, or 10 μm or more. The thickness of the positive electrode current collector 9 may be 100 μm or less, 50 μm or less, or 20 μm or less.

The first electrochemical device electrode 13A comprises a positive electrode mixture layer 10. The positive electrode mixture layer 10, in one embodiment, comprises a positive electrode active material, a specific polymer, a specific electrolyte salt, and a specific molten salt.

The positive electrode mixture layer 10 comprises the positive electrode active material. The positive electrode active material may be, for example, a lithium transition metal compound such as a lithium transition metal oxide and a lithium transition metal phosphate.

The lithium transition metal oxide may be lithium manganate, lithium nickelate, lithium cobaltate, or the like. The lithium transition metal oxide may be a lithium transition metal oxide obtained by substituting a portion of the transition metal such as Mn, Ni, and Co comprised in lithium manganate, lithium nickelate, lithium cobaltate, or the like with one or two or more other transition metals or metal elements (typical element) such as Mg and Al. That is, the lithium transition metal oxide may be a compound represented by $LiM^1O_2$ or $LiM^1O_4$ ($M^1$ includes at least one transition metal). The lithium transition metal oxide may be specifically $Li(Co_{1/3}Ni_{1/3}Mn_{1/3})O_2$, $LiNi_{1/2}Mn_{1/2}O_2$, $LiNi_{1/2}Mn_{3/2}O_4$, or the like.

The lithium transition metal oxide may be a compound represented by the following formula (A), from the viewpoint of further enhancing the energy density.

(A)

In the formula (A), $M^2$ is at least one selected from the group consisting of Al, Mn, Mg, and Ca, a, b, c, d, and e are numbers each satisfying $0.2 \leq a \leq 1.2$, $0.5 \leq b \leq 0.9$, $0.1 \leq c \leq 0.4$, $0 \leq d \leq 0.2$, and $-0.2 \leq e \leq 0.2$ and satisfying b+c+d=1.

The lithium transition metal phosphate may be $LiFePO_4$, $LiMnPO_4$, $LiMn_xM^3_{1-x}PO_4$ ($0.3 \leq x \leq 1$, and $M^3$ is at least one element selected from the group consisting of Fe, Ni, Co, Ti, Cu, Zn, Mg, and Zr), or the like.

The content of the positive electrode active material may be 70% by mass or more, 80% by mass or more, or 90% by mass or more based on the total amount of the positive electrode mixture layer. The content of the positive electrode active material may be 99% by mass or less based on the total amount of the positive electrode mixture layer.

The positive electrode mixture layer 10 comprises a polymer having a structural unit represented by the following formula (1).

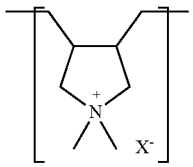

(1)

In the formula (1), $X^-$ represents a counter anion. Examples of $X^-$ herein include $BF_4^-$ (tetrafluoroborate anion), $PF_6^-$ (hexafluorophosphate anion), $N(FSO_2)_2^-$ (bis (fluorosulfonyl)imide anion, [FSI]$^-$), $N(CF_3SO_2)_2^-$ (bis(trifluoromethanesulfonyl)imide anion, [TFSI]$^-$), $C(SO_2F)_3^-$ (tris(fluorosulfonyl)carbanion, [f3C]$^-$), $B(C_2O_4)_2^-$ (bisoxalatoborate anion, [BOB]$^-$), $BF_3(CF_3)^-$, $BF_3(C_2F_5)^-$, $BF_3(C_3F_7)^-$, $BF_3(C_4F_9)^-$, $C(SO_2CF_3)_3^-$, $CF_3SO_2O^-$, $CF_3COO^-$, and $RCOO^-$ (R is an alkyl group having 1 to 4 carbon atoms, a phenyl group, or a naphthyl group). Of these, $X^-$ is preferably at least one selected from the group consisting of $BF_4^-$, $PF_6^-$, [FSI]$^-$, [TFSI]$^-$, and [f3C]$^-$, more preferably [TFSI]$^-$ or [FSI]$^-$.

The viscosity average molecular weight My (g·mol$^{-1}$) of the polymer having a structural unit represented by the formula (1) is not particularly limited, and is preferably $1.0 \times 10^4$ or more, more preferably $1.0 \times 10^5$ or more. Also, the viscosity average molecular weight of the polymer is preferably $5.0 \times 10^6$ or less, more preferably $1.0 \times 10^6$ or less.

In the present description, the "viscosity average molecular weight" can be evaluated by viscometry, which is a general measuring method, and can be calculated from, for example, an intrinsic-viscosity number [η] measured based on JISK7367-3:1999.

It is preferred that the polymer having a structural unit represented by the formula (1) be a polymer composed only of the structural unit represented by the formula (1), that is a homopolymer, from the viewpoint of ionic conductivity.

The polymer having a structural unit represented by the formula (1) may be a polymer represented by the following formula (2).

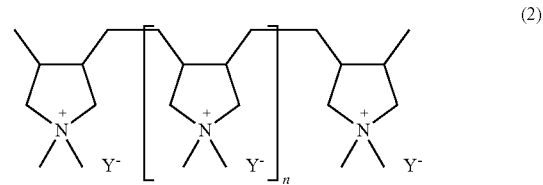

(2)

In the formula (2), n is 300 to 4000, and $Y^-$ represents a counter anion. As $Y^-$, it is possible to use one similar to those exemplified for $X^-$.

n is 300 or more, preferably 400 or more, more preferably 500 or more. n is also 4000 or less, preferably 3500 or less, more preferably 3000 or less. n is also 300 to 4000, preferably 400 to 3500, more preferably 500 to 3000.

The method for producing a polymer having a structural unit represented by the formula (1) is not particularly limited, and it is possible to use, for example, the method for production described in Journal of Power Sources 2009, 188, 558-563.

The polymer having a structural unit represented by the formula (1) ($X^-$=[TFSI]$^-$) can be obtained by, for example, the following production method.

First, poly(diallyldimethyl ammonium)chloride ([P (DADMA)][Cl]) is dissolved in deionized water and stirred to prepare a [P(DADMA)][Cl] aqueous solution. As [P(DADMA)][Cl], for example, a commercially available product can be uses as it is. Then, Li[TFSI] is separately dissolved in deionized water to prepare an aqueous solution comprising Li[TFSI]. Thereafter, the two aqueous solutions are mixed such that the molar ratio of Li[TFSI] to [P(DAD-MA)][Cl] (molar number of Li[TFSI]/molar number of [P(DADMA)][Cl]) falls within 1.2 to 2.0 and stirred for 2 to 8 hours to precipitate solid out, and the resulting solid is collected by filtration. By washing the solid using deionized water and drying the solid under vacuum for 12 to 48 hours, it is possible to obtain a polymer having a structural unit represented by the formula (1) ([P(DADMA)][TFSI]).

The content of the polymer having a structural unit represented by the formula (1) may be 5 to 50% by mass based on the total amount of the polymer, an electrolyte salt mentioned below, and a molten salt mentioned below. The content of the polymer is more preferably 8% by mass or more, still more preferably 15% by mass or more based on the total amount of the polymer, the electrolyte salt, and the molten salt. Also, the content of the polymer is more preferably 35% by mass or less, still more preferably 25% by mass or less based on the total amount of the polymer, the electrolyte salt, and the molten salt.

The content of the polymer having a structural unit represented by the formula (1) is not particularly limited, and may be 0.5% by mass or more based on the total amount of the positive electrode mixture layer. Also, the content of the polymer may be 25% by mass or less based on the total amount of the positive electrode mixture layer.

The positive electrode mixture layer 10 comprises at least one electrolyte salt selected from the group consisting of lithium salts, sodium salts, magnesium salts, and calcium salts. As the electrolyte salt, ones used as an electrolyte salt for liquid electrolytes for common ion batteries can be used. The anion of the electrolyte salt may be a halide ion, ($I^-$, $Cl^-$, $Br^-$, or the like), $SCN^-$, $BF_4^-$, $BF_3(CF_3)^-$, $BF_3(C_2F_5)^-$, $BF_3(C_3F_7)^-$, $BF_3(C_4F_9)^-$, $PF_6^-$, $ClO_4^-$, $SbF_6^-$, $[FSI]^-$, $[TFSI]^-$, $N(C_2F_5SO_2)_2^-$, $BPh_4^-$, $B(C_2H_4O_2)_2^-$, $[f3C]^-$, $C(CF_3SO_2)_3^-$, $CF_3COO^-$, $CF_3SO_2O^-$, $C_6F_5SO_2O^-$, $[BOB]^-$, $RCOO^-$ (R is an alkyl group having 1 to 4 carbon atoms, a phenyl group, or a naphthyl group), or the like. Of these, the anion of the electrolyte salt is preferably at least one selected from the group consisting of $PF_6^-$, $BF_4^-$, $[FSI]^-$, $[TFSI]^-$, $[BOB]^-$, and $ClO_4^-$, more preferably $[TFSI]^-$ or $[FSI]^-$, still more preferably $[FSI]^-$.

The lithium salt may be $LiPF_6$, $LiBF_4$, $Li[FSI]$, $Li[TFSI]$, $Li[f3C]$, $Li[BOB]$, $LiClO_4$, $LiBF_3(CF_3)$, $LiBF_3(C_2F_5)$, $LiBF_3(C_3F_7)$, $LiBF_3(C_4F_9)$, $LiC(SO_2CF_3)_3$, $LiCF_3SO_2O$, $LiCF_3COO$, LiRCOO (R is an alkyl group having 1 to 4 carbon atoms, a phenyl group, or a naphthyl group), or the like. These may be used singly or two or more of these may be used in combination.

The sodium salt may be $NaPF_6$, $NaBF_4$, $Na[FSI]$, $Na[TFSI]$, $Na[f3C]$, $Na[BOB]$, $NaClO_4$, $NaBF_3(CF_3)$, $NaBF_3(C_2F_5)$, $NaBF_3(C_3F_7)$, $NaBF_3(C_4F_9)$, $NaC(SO_2CF_3)_3$, $NaCF_3SO_2O$, $NaCF_3COO$, NaRCOO (R is an alkyl group having 1 to 4 carbon atoms, a phenyl group, or a naphthyl group), or the like. These may be used singly or two or more of these may be used in combination.

The magnesium salt may be $Mg(PF_6)_2$, $Mg(BF_4)_2$, $Mg[FSI]_2$, $Mg[TFSI]_2$, $Mg[f3C]_2$, $Mg[BOB]_2$, $Mg(ClO_4)_2$, $Mg[BF_3(CF_3)]_2$, $Mg[BF_3(C_2F_5)]_2$, $Mg[BF_3(C_3F_7)]_2$, $Mg[BF_3(C_4F_9)]_2$, $Mg[C(SO_2CF_3)_3]_2$, $Mg(CF_3SO_2O)_2$, $Mg(CF_3COO)_2$, $Mg(RCOO)_2$ (R is an alkyl group having 1 to 4 carbon atoms, a phenyl group, or a naphthyl group), or the like. These may be used singly or two or more of these may be used in combination.

The calcium salt may be $Ca(PF_6)_2$, $Ca(BF_4)_2$, $Ca[FSI]_2$, $Ca[TFSI]_2$, $Ca[f3C]_2$, $Ca[BOB]_2$, $Ca(ClO_4)_2$, $Ca[BF_3(CF_3)_3]_2$, $Ca[BF_3(C_2F_5)]_2$, $Ca[BF_3(C_3F_7)]_2$, $Ca[BF_3(C_4F_9)]_2$, $Ca[C(SO_2CF_3)_3]_2$, $Ca(CF_3SO_2O)_2$, $Ca(CF_3COO)_2$, $Ca(RCOO)_2$ (R is an alkyl group having 1 to 4 carbon atoms, a phenyl group, or a naphthyl group) or the like. These may be used singly or two or more of these may be used in combination.

Of these, the electrolyte salt is preferably a lithium salt, more preferably at least one selected from the group consisting of $LiPF_6$, $LiBF_4$, $Li[FSI]$, $Li[TFSI]$, $Li[f3C]$, $Li[BOB]$, and $LiClO_4$, still more preferably $Li[TFSI]$ or $Li[FSI]$, particularly preferably $Li[FSI]$, from the viewpoint of dissociation ability and electrochemical stability.

The mass ratio of the electrolyte salt to the polymer having a structural unit represented by the formula (1) (mass of the electrolyte salt/mass of the polymer having a structural unit represented by the formula (1)) is not particularly limited, and is preferably 0.1 or more, more preferably 0.15 or more, still more preferably 0.2 or more. The mass ratio is also preferably 1.0 or less, more preferably 0.9 or less, still more preferably 0.8 or less. When the mass ratio is 0.1 or more, the ion carrier concentration becomes sufficient and the ionic conductivity tends to further increase. When the mass ratio is 1.0 or less, the flexibility of the electrolyte tends to further increase.

The content of electrolyte salt may be 5 to 30% by mass based on the total amount of the polymer, the electrolyte salt, and the molten salt mentioned below. The content of the electrolyte salt is more preferably 10% by mass or more based on the total amount of the polymer, the electrolyte salt, and the molten salt. Also, the content of the molten salt is more preferably 25% by mass or less based on the total amount of the polymer, the electrolyte salt, and the molten salt.

The content of the electrolyte salt is not particularly limited, and may be 0.1% by mass or more based on the total amount of the positive electrode mixture layer. Also, the content of the electrolyte salt may be 15% by mass or less based on the total amount of the positive electrode mixture layer.

The positive electrode mixture layer 10 comprises a molten salt having a melting point of 250° C. or less. A molten salt is composed of a cation and an anion. As the molten salt, a common ionic liquid or plastic crystal, as long as the melting point thereof is 250° C. or less, can be used without limitation.

It should be noted that, in the present description, an "ionic liquid" means a molten salt that is liquid at 30° C., that is, a molten salt of which a melting point is 30° C. or less, and a "plastic crystal" means a molten salt that is solid at 30° C., that is, a molten salt of which a melting point is higher than 30° C.

The ionic liquid, if it is a molten salt that is liquid at 30° C., can be used without particular limitation. Specifically, examples thereof include ionic liquids that are obtained by combining a cation such as $[EMI]^+$, $[DEME]^+$, $[Py12]^+$, $[Py13]^+$, or $[PP13]^+$ and an anion such as $PF_6^-$, $BF_4^-$, $[FSI]^-$, $[TFSI]^-$, or $[f3C]^-$, the ionic liquids being liquid at 30° C. More specifically, examples thereof include [EMI][TFSI](melting point: −15° C.), [DEME][TFSI] (melting point: −83° C.), [EMI][FSI] (melting point: −13° C.), [DEME][FSI] (melting point: <25° C.), and [Py13][FSI] (melting point: −10° C.). These may be used singly or two or more of these may be used in combination. Also, the ionic liquid may be used in combination with a plastic crystal mentioned below.

The melting point of the ionic liquid is not particularly limited, and is preferably 25° C. or less, more preferably 10° C. or less, still more preferably 0° C. or less. When the melting point is 25° C. or less, the ionic conductivity tends to be unlikely to decrease even at room temperature (e.g., 25° C.) or less. The lower limit of the melting point of the ionic liquid is not particularly limited, and may be −150° C. or more, −120° C. or more, or −90° C. or more.

A plastic crystal, if it is a molten salt that is solid at 30° C. and of which a melting point is 250° C. or less, can be used without particular limitation. Specifically, examples thereof include plastic crystals that are obtained by combining a cation such as $[EMI]^+$, $[DEME]^+$, $[Py12]^+$, $[Py13]^+$, or $[PP13]^+$ and an anionic component such as $PF_6^-$, $BF_4^-$, $[FSI]^-$, $[TFSI]^-$, or $[f3C]^-$, the plastic crystals being solid at 30° C. More specifically, examples thereof include [Py12][TFSI] (melting point: 90° C.), [Py12][FSI] (melting point: 205° C.), [DEME][f3C](melting point: 69° C.), [Py13][f3C] (melting point: 177° C.), and [PP13][f3C] (melting point: 146° C.). These may be used singly or two or more of these may be used in combination. Also, the plastic crystal may be used in combination with the ionic liquid mentioned above. When the melting point is 80° C. or more, the plastic crystal tends to further suppress liquid leakage during normal battery use. Accordingly, a battery having a bipolar electrode in which electrodes are layered in series in a single cell can be achieved by use of the plastic crystal.

The cation of the molten salt is, from the viewpoint of ionic conductivity, preferably [EMI]$^+$, [DEME]$^+$, [Py12]$^+$, or [Py13]$^+$, more preferably [EMI]$^+$. The anion of the molten salt is, from the viewpoint of ionic conductivity, preferably [FSI]$^-$ or [TFSI]$^-$, more preferably [FSI]$^-$. It is preferable for the molten salt, from the viewpoint of ionic conductivity, to comprise [EMI][FSI], [DEME][FSI], [Py12][FSI], [Py13][FSI], [EMI] [TFSI], [DEME] [TFSI], [Py12][TFSI], or [Py13][TFSI], more preferable to comprise [EMI][FSI].

The melting point of the plastic crystal is 250° C. or less, preferably 200° C. or less, more preferably 150° C. or less, still more preferably 100° C. or less. When the melting point is 250° C. or less, the ionic conductivity tends to increase. The lower limit of the melting point of the molten salt is not particularly limited, and can be 80° C. or more, for example.

The content of the molten salt may be 10 to 80% by mass based on the total amount of the polymer, the electrolyte salt, and the molten salt. The content of the molten salt is more preferably 20% by mass or more, still more preferably 30% by mass or more, particularly preferably 40% by mass or more based on the total amount of the polymer, the electrolyte salt, and the molten salt. Also, the content of the molten salt is more preferably 75% by mass or less, still more preferably 70% by mass or less based on the total amount of the polymer, the electrolyte salt, and the molten salt.

The content of the molten salt is not particularly limited, and may be 0.5% by mass or more based on the total amount of the positive electrode mixture layer. Also, the content of the molten salt may be 25% by mass or less based on the total amount of the positive electrode mixture layer.

The positive electrode mixture layer 10 may further comprise a conductive agent, a binder, and the like.

The conductive agent may be carbon black, graphite, carbon fiber, carbon nanotubes, acetylene black, or the like.

The content of the conductive agent may be 1 to 15% by mass based on the total amount of the positive electrode mixture layer.

Examples of the binder may include resins such as polyvinylidene fluoride, polyacrylonitrile, styrene-butadiene rubber, carboxymethyl cellulose, fluorine rubber, ethylene-propylene rubber, polyacrylic acid, polyimide, and polyamide; and copolymer resins having these resins as the main skeleton (e.g., polyvinylidene fluoride-hexafluoropropylene copolymer).

The content of the binder may be 1 to 15% by mass based on the total amount of the positive electrode mixture layer.

The thickness of the positive electrode mixture layer 10 is not particularly limited, and may be 10 μm or more, 20 μm or more, or 30 μm or more. The thickness of the positive electrode mixture layer 10 may be 100 μm or less, 80 μm or less, or 60 μm or less.

The mixture density of the positive electrode mixture layer 10 may be 1 g/cm$^3$ or more.

The electrolyte layer 7, in one embodiment, comprises a solid electrolyte, an electrolyte salt, and a molten salt. As the electrolyte layer 7, for example, a sheet formed from an electrolyte composition comprising the components (electrolyte sheet) can be used.

Examples of the solid electrolyte include polymer electrolytes and inorganic solid electrolytes. The polymer electrolyte and the inorganic solid electrolyte are not particularly limited, and ones used as a polymer electrolyte and an inorganic solid electrolyte for common ion batteries can be used.

The polymer having a structural unit represented by the formula (1) mentioned above may have properties as a polymer electrolyte. Thus, the polymer can be suitably employed as a polymer electrolyte.

The inorganic solid electrolyte may be $Li_7La_3Zr_2O_{12}$ (LLZ) or the like.

The electrolyte salt and the molten salt may be ones similar to the electrolyte salt and the molten salt, comprised in the positive electrode mixture layer mentioned above.

The electrolyte composition may further comprise an additive having a lithium-salt dissociation ability such as borate ester and aluminate ester, and the like, as required.

When an electrolyte sheet that has been formed into a sheet form in advance is employed as the electrolyte layer 7, the electrolyte sheet may be a sheet formed from an electrolyte composition comprising oxide particles, a binder, an electrolyte salt, and an ionic liquid.

The oxide particles are, for example, particles of an inorganic oxide. The inorganic oxide may be an inorganic oxide comprising, for example, Li, Mg, Al, Si, Ca, Ti, Zr, La, Na, K, Ba, Sr, V, Nb, B, Ge or the like, as the constituent element. The oxide particles may be at least one type of particles selected from the group consisting of $SiO_2$, $Al_2O_3$, AlOOH, MgO, CaO, $ZrO_2$, $TiO_2$, $Li_7La_3Zr_2O_{12}$, and $BaTiO_3$. Having a polarity, the oxide particles can facilitate dissociation of the electrolyte in the electrolyte layer 7 to thereby improve the battery characteristics.

The binder, the electrolyte salt, and the ionic liquid may be ones similar to the binder, the electrolyte salt, and the ionic liquid, comprised in the positive electrode mixture layer mentioned above.

The thickness of the electrolyte layer 7 may be 5 to 200 μm from the viewpoint of enhancing the strength and improving the safety.

FIG. 4(*a*) is a cross sectional view taken along line II-II of FIG. 2. A negative electrode 8 (second electrochemical device electrode 14A) comprises a negative electrode current collector 11 and a negative electrode mixture layer 12 provided on at least one principal surface of the negative electrode current collector 11, as shown in FIG. 4(*a*).

FIG. 4(*b*) is a schematic cross sectional view showing a second electrochemical device electrode according to another embodiment. As shown in FIG. 4(*b*), a second electrochemical device electrode 14B comprises a negative electrode current collector 11, a negative electrode mixture layer 12, and an electrolyte layer 7 in this order. The electrolyte layer 7 is similar to the electrolyte layer 7 in the first electrochemical device electrode mentioned above, and the description thereof will be omitted here.

The second electrochemical device electrode 14A comprises the negative electrode current collector 11. The negative electrode current collector 11 may be formed with copper, stainless steel, titanium, nickel or the like. The negative electrode current collector 11 may be specifically a rolled copper foil, a perforated copper foil having a pore diameter of 0.1 to 10 mm, an expanded metal, a foamed metal sheet or the like. The negative electrode current collector 11 may be formed with any material other than those described above, and additionally, its shape and production method are not limited.

The thickness of the negative electrode current collector 11 may be 1 μm or more, 5 μm or more, or 10 μm or more. The thickness of the negative electrode current collector 11 is 100 μm or less, 50 μm or less, or 20 μm or less.

The second electrochemical device electrode 14A comprises the negative electrode mixture layer 12. The negative electrode mixture layer 12, in one embodiment, comprises a negative electrode active material, a specific polymer, a specific electrolyte salt, and a specific molten salt.

The negative electrode mixture layer 12 comprises the negative electrode active material. As the negative electrode active material, ones used as a negative electrode active material in the field of common energy devices such as secondary batteries can be used. Examples of the negative electrode active material include metal lithium, lithium alloys, metal compounds, carbon materials, metal complexes, and organic polymer compounds. These may be used singly or two or more of these may be used in combination. Of these, it is preferred that the negative electrode active material be a carbon material. Examples of the carbon material include graphite such as natural graphite (such as scale-like graphite) and artificial graphite, carbon black such as acetylene black, Ketjen black, channel black, furnace black, lamp black, and thermal black, amorphous carbon, and carbon fibers. It is preferred that the negative electrode active material comprise graphite.

The content of the negative electrode active material may be 60% by mass or more, 65% by mass or more, or 70% by mass or more based on the total amount of the negative electrode mixture layer. The content of the negative electrode active material may be 99% by mass or less, 95% by mass or less, or 90% by mass or less based on the total amount of the negative electrode mixture layer.

The negative electrode mixture layer 12 comprises, comprised in the positive electrode mixture layer 10, a polymer having a structural unit represented by the formula (1), at least one electrolyte salt selected from the group consisting of lithium salts, sodium salts, calcium salts, and magnesium salts, and a molten salt having a melting point of 250° C. or less. The content of these are the same as in the positive electrode mixture layer 10.

When the negative electrode active material comprises graphite, it is preferred that the electrolyte salt comprise Li[FSI]. The battery characteristics of the secondary battery to be obtained tends to further increase by comprising graphite as the negative electrode active material and comprising Li[FSI] as the electrolyte salt.

The negative electrode mixture layer 12 may further comprise a conductive agent, a binder, and the like, comprised in the positive electrode mixture layer 10 mentioned above. The content of these are the same as in the positive electrode mixture layer 10.

The thickness of the negative electrode mixture layer 12 is not particularly limited, and may be 10 µm or more, 15 µm or more, or 20 µm or more. The thickness of the negative electrode mixture layer 12 may be 50 µm or less, 45 µm or less, or 40 µm or less.

The mixture density of the negative electrode mixture layer 12 may be 1 g/cm$^3$ or more.

Subsequently, a method for producing the secondary battery 1 mentioned above will be described. A method for producing the secondary battery 1 according to First Embodiment comprises a first step of producing a first electrochemical device electrode 13A (positive electrode 6), a second step of producing a second electrochemical device electrode 14A (negative electrode 8), and a third step of providing an electrolyte layer 7 between the first electrochemical device electrode 13A (positive electrode 6) and the second electrochemical device electrode 14A (negative electrode 8).

A method for producing the first electrochemical device electrode 13A (positive electrode 6) in the first step mentioned above comprises a step of providing a positive electrode precursor in which a positive electrode active material layer comprising a positive electrode active material is provided on at least one principal surface of a positive electrode current collector, a step of adding a slurry comprising a polymer having a structural unit represented by the formula (1), at least one electrolyte salt selected from the group consisting of lithium salts, sodium salts, calcium salts, and magnesium salts, a molten salt having a melting point of 250° C. or less, and a dispersion medium to the positive electrode active material layer of the positive electrode precursor, and a step of removing a volatile component from the slurry added to the positive electrode active material layer to form a positive electrode mixture layer. The positive electrode mixture layer may be composed of the electrode active material, the polymer, the electrolyte salt, and the molten salt because the volatile component (dispersion medium) is removed.

The positive electrode active material layer in the positive electrode precursor can produced, for example, by preparing a slurry for forming a positive electrode active material layer in which a material comprising a positive electrode active material, a conductive agent, a binder, and the like is dispersed in a dispersion medium, applying the slurry to a positive electrode current collector 9, and drying the slurry. The dispersion medium is not particularly limited, and may be water, an aqueous solvent such as a mixed solvent of alcohol and water, or an organic solvent such as N-methyl-2-pyrrolidone.

Subsequently, a slurry in which a material comprising a polymer, an electrolyte salt, and a molten salt is dispersed in a dispersion medium (slurry for forming a positive electrode mixture layer) is prepared, and the slurry is added to the positive electrode active material layer. A method for adding the slurry is not particularly limited, and examples thereof include dropping, application, and printing. The dispersion medium is not particularly limited as long as a polymer is dissolved in the medium, and may be acetone, ethyl methyl ketone, γ-butyrolactone, or the like. Of these, it is preferred that the dispersion medium comprise acetone.

The content of the polymer, the content of the electrolyte salt, and the content of the molten salt, based on the total amount of the polymer, the electrolyte salt, and the molten salt in the slurry may be the same as the content of the polymer, the content of the electrolyte salt, and the content of the molten salt, based on the total amount of the polymer, the electrolyte salt, and the molten salt in the positive electrode mixture layer 10 mentioned above.

The mass ratio of the content of the dispersion medium to the content of the polymer may be 6 or less. The mass ratio of the content of the dispersion medium to the content of the polymer is more preferably 5.5 or less, still more preferably 5 or less. When the mass ratio of the content of the dispersion medium to the content of the polymer is 6 or less, it is possible to further enhance the polymer filling of the positive electrode mixture layer, and a better ionic conductivity tends to be obtained. The lower limit of the mass ratio of the content of the dispersion medium to the content of the polymer is not particularly limited, and may be, for example, 0.1 or more, 0.5 or more, 1 or more, or 2 or more.

Thereafter, the volatile component is removed from the slurry added to the positive electrode active material layer to form the positive electrode mixture layer 10. The method for removing the volatile component is not particularly limited, and can be performed in a manner usually employed.

The second electrochemical device electrode 14A (negative electrode 8) in the second step can be produced by a production method similar to that for the first electrochemical device electrode 13A (positive electrode 6) in the first step mentioned above. That is, the method for producing the second electrochemical device electrode 14A (negative electrode 8) comprises a step of providing a negative electrode precursor in which a negative electrode active material layer comprising a negative electrode active material is provided on at least one principal surface of a negative electrode current collector, a step of adding a slurry comprising a polymer having a structural unit represented by the formula (1), at least one electrolyte salt selected from the group consisting of lithium salts, sodium salts, calcium salts, and magnesium salts, a molten salt having a melting point of 250° C. or less, and a dispersion medium to the negative electrode active material layer of the negative electrode precursor, and a step of removing a volatile component from the slurry added to the negative electrode active material layer to form a negative electrode mixture layer. The negative electrode mixture layer may be composed of the electrode active material, the polymer, the electrolyte salt, and the molten salt because the volatile component (dispersion medium) is removed.

The electrolyte layer 7 is formed by application on either one of the side of the positive electrode mixture layer 10 of the first electrochemical device electrode 13A (positive electrode 6) or the side of the negative electrode mixture layer 12 of the second electrochemical device electrode 14A (negative electrode 8). The electrolyte layer 7 may be formed by application on both of the side of the positive electrode mixture layer 10 of the first electrochemical device electrode 13A (positive electrode 6) and the side of the negative electrode mixture layer 12 of the second electrochemical device electrode 14A (negative electrode 8). In this case, it is possible to produce the secondary battery 1 by, for example, layering the positive electrode 6 (that is, first electrochemical device electrode 13B) on which the electrolyte layer 7 is provided and the negative electrode 8 (that is, second electrochemical device electrode 14B) on which the electrolyte layer 7 is provided such that the electrolyte layers 7 are brought into contact with each other.

In the third step, in another embodiment, it is possible to produce the electrolyte layer 7 by kneading a material to be used for the electrolyte layer 7, dispersing the material in a dispersion medium to obtain a slurry for forming an electrolyte sheet, then applying this slurry on a substrate, and removing the dispersion medium. The dispersion medium may be an organic solvent such as acetone, methyl ethyl ketone, γ-butyrolactone, N-methyl-2-pyrrolidone, or the like. In this case, in the third step, it is possible to produce the secondary battery 1 by layering the first electrochemical device electrode 13A (positive electrode 6), the electrolyte layer 7, and the second electrochemical device electrode 14A (negative electrode 8), for example, via lamination. In this time, lamination is carried out such that the electrolyte layer 7 is positioned on the side of the positive electrode mixture layer 10 of the first electrochemical device electrode 13A (positive electrode 6) and on the side of the negative electrode mixture layer 12 of the second electrochemical device electrode 14A (negative electrode 8), that is, the positive electrode current collector 9, the positive electrode mixture layer 10, the electrolyte layer 7, the negative electrode mixture layer 12, and the negative electrode current collector 11 are placed in this order.

An example of the method for forming the electrolyte layer 7 on the positive electrode mixture layer 10 of the positive electrode 6 (that is, the method for producing the first electrochemical device electrode 13B) is a method in which a material to be used for the electrolyte layer 7 is dispersed in a dispersion medium to obtain a slurry for forming an electrolyte layer and then this slurry for forming an electrolyte layer is applied on the positive electrode mixture layer 10 using an applicator.

The dispersion medium may be an organic solvent such as acetone, methyl ethyl ketone, γ-butyrolactone, N-methyl-2-pyrrolidone, or the like. When the material to be used for the electrolyte layer 7 is dispersed in a dispersion medium, the electrolyte salt may be dissolved in the molten salt in advance, and then, the dissolved electrolyte salt may be dispersed along with other materials in the dispersion medium.

The method for forming the electrolyte layer 7 on the negative electrode mixture layer 12 of the negative electrode 8 (that is, the method for producing the second electrochemical device electrode 14B) may be the same as the method for forming the electrolyte layer 7 on the positive electrode mixture layer 10 of the positive electrode 6.

Figure 5:
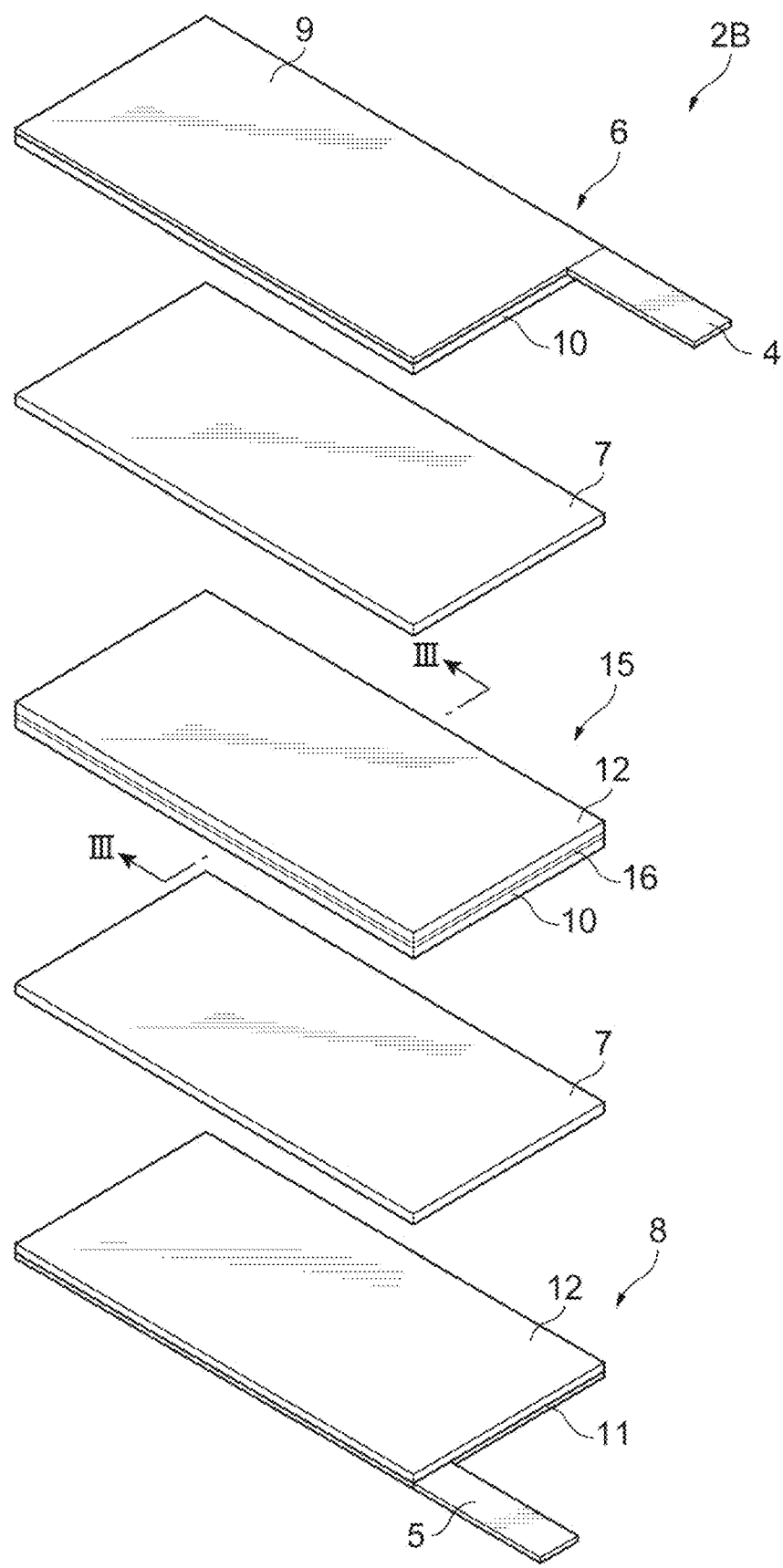
FIG. 5 is an exploded perspective view showing an electrode group of an electrochemical device according to Second Embodiment.

Subsequently, a secondary battery according to Second Embodiment will be described. FIG. 5 is an exploded perspective view showing the electrode group of a secondary battery according to Second Embodiment. As shown in FIG. 5, the point where the secondary battery in Second Embodiment is different from the secondary battery of First Embodiment is that an electrode group 2B further comprises a bipolar electrode 15. That is, the electrode group 2B comprises a positive electrode 6, a first electrolyte layer 7, a bipolar electrode 15, a second electrolyte layer 7, and a negative electrode 8 in this order.

The bipolar electrode 15 comprises a bipolar electrode current collector 16, a positive electrode mixture layer 10 provided on the surface of the side of the negative electrode 8 of the bipolar electrode current collector 16, and a negative electrode mixture layer 12 provided on the surface of the side of the positive electrode 6 of the bipolar electrode current collector 16.

FIG. 6(a) is a cross sectional view taken along line III-III of FIG. 5. The bipolar electrode 15 constitutes a third electrochemical device electrode. That is, as shown in FIG. 6(a), a third electrochemical device electrode 17A is a bipolar electrode member comprising a bipolar electrode current collector 16, a positive electrode mixture layer 10 provided on one surface of the bipolar electrode current collector 16, and a negative electrode mixture layer 12 provided on the other surface of the bipolar electrode current collector 16.

FIG. 6(b) is a schematic cross sectional view showing a third electrochemical device electrode (bipolar electrode member) according to another embodiment. As shown in FIG. 6(b), a third electrochemical device electrode 17B comprises a bipolar electrode current collector 16, a positive electrode mixture layer 10 provided on one surface of the bipolar electrode current collector 16, a second electrolyte layer 7 provided on the side of the positive electrode mixture layer 10 opposite to the bipolar electrode current collector 16, a negative electrode mixture layer 12 provided on the other side of the bipolar electrode current collector 16, and a first electrolyte layer 7 provided on the side of the negative electrode mixture layer 12 opposite to the bipolar electrode current collector 16.

The bipolar electrode current collector 16 may be of aluminum, stainless steel, titanium, or the like or may be of a clad material obtained by rolling and joining aluminum, copper or stainless steel, and copper or the like.

The first electrolyte layer 7 and the second electrolyte layer 7 may be the same or different from each other.

[Fourth Aspect (Polymer Electrolyte Composition)]

A polymer electrolyte composition comprises a polymer having a structural unit represented by the formula (1), at least one electrolyte salt selected from the group consisting of lithium salts, sodium salts, calcium salts, and magnesium salts, and a molten salt having a melting point of 250° C. or less. It is possible to improve the ionic conductivity of the electrode mixture layer by applying the polymer electrolyte composition to the electrode mixture layer. Thus, it is possible to suitably use the polymer electrolyte composition for forming an electrode mixture layer. The polymer electrolyte composition may further comprise a dispersion medium.

The polymer, the electrolyte salt, and the molten salt may be similar to those exemplified for the polymer, the electrolyte salt, and the molten salt in the positive electrode mixture layer 10 mentioned above. The content of the polymer, the content of the electrolyte salt, and the content of the molten salt based on the total amount of the polymer, the electrolyte salt, and the molten salt may be similar to the numerical values exemplified for the content of the polymer, the content of the electrolyte salt, and the content of the molten salt based on the total amount of the polymer, the electrolyte salt, and the molten salt in the positive electrode mixture layer 10 mentioned above.

The dispersion medium may be similar to that exemplified as the dispersion medium for the slurry in the first step of producing the first electrochemical device electrode 13A (positive electrode 6) (slurry for forming a positive electrode mixture layer). The mass ratio of the content of the dispersion medium to the content of the polymer may be similar to the numerical values exemplified for the mass ratio of the content of the dispersion medium to the content of the polymer in the first step of producing the first electrochemical device electrode 13A (positive electrode 6).

EXAMPLES

Hereinbelow, the invention will be described more specifically according to Examples, but the present invention is not intended to be limited to these Examples.

1. Production and Evaluation of Secondary Battery-1

[Production of Electrodes for Secondary Battery and Secondary Battery]

<Production of Positive Electrode Precursor>

Mixed were 80 parts by mass of $Li(Co_{1/3}Ni_{1/3}Mn_{1/3})O_2$ (positive electrode active material), 10 parts by mass of acetylene black (conductive agent, trade name: HS-100, average particle size 48 nm (manufacturer catalog value), Denka Company Limited), 83 parts by mass of a polyvinylidene fluoride solution (binder, trade name: Kureha KF Polymer #1120, solid content 12% by mass, KUREHA CORPORATION), and 2.5 parts by mass of N-methyl-2-pyrrolidone (dispersion medium, NMP) to prepare a slurry for forming a positive electrode active material layer. This slurry for forming a positive electrode active material layer was applied on both surfaces (both principal surfaces) of a positive electrode current collector (an aluminum foil of which thickness is 20 μm) and dried at 120° C. Then, rolling is conducted to form a positive electrode active material layer in which the amount applied on one surface was 60 g/m² and the mixture density was 2.3 g/cm³, and a positive electrode precursor was produced.

<Production of Negative Electrode Precursor>

Mixed were 88 parts by mass of $Li_4Ti_5O_{12}$ (negative electrode active material), 5 parts by mass of acetylene black (conductive agent, trade name: HS-100, average particle size 48 nm (manufacturer catalog value), Denka Company Limited), 54 parts by mass of a polyvinylidene fluoride solution (binder, trade name: Kureha KF Polymer #9130, solid content 13% by mass, KUREHA CORPORATION), and 23 parts by mass of N-methyl-2-pyrrolidone (dispersion medium, NMP) to prepare a slurry for forming a negative electrode active material layer. This slurry for forming a negative electrode active material layer was applied on both surfaces of a negative electrode current collector (an aluminum foil of which thickness is 20 μm) and dried at 120° C. Then, rolling was conducted to form a negative electrode active material layer in which the amount applied on one surface was 67 g/m² and the mixture density was 1.8 g/cm³, and a negative electrode precursor was produced.

<Synthesis of Polymer [P(DADMA)][TFSI]>

A polymer having a structural unit represented by the formula (1) was synthesized by converting the counter anion $Cl^-$ of poly(diallyldimethyl ammonium)chloride to $[TFSI]^-$.

Diluted was 100 parts by mass of a [P(DADMA)][Cl] aqueous solution (20% by mass aqueous solution, manufactured by Sigma-Aldrich Co. LLC.) with 500 parts by mass of distilled water to prepare a diluted polymer aqueous solution. Then, 43 parts by mass of Li[TFSI] (manufactured by KISHIDA CHEMICAL Co., Ltd.) was dissolved in 100 parts by mass of water to prepare a Li[TFSI] aqueous solution. This was added dropwise to the diluted polymer aqueous solution, and a white precipitate was obtained by stirring for two hours. The precipitate was separated by filtration, and after washing with 400 parts by mass of distilled water, filtration was conducted again. Washing and filtration were repeated five times. Thereafter, moisture was evaporated by vacuum drying at 105° C. to obtain [P(DADMA)][TFSI]. The viscosity average molecular weight of [P(DADMA)][TFSI] was $2.11\times10^6$ g·mol$^{-1}$.

After the viscosity of the polymer [η] at 25° C. was measured by using poly(methyl methacrylate) (PMMA) as the reference material and using an Ubbelohde viscometer, the viscosity average molecular weight My was calculated based on [η]=KMv (wherein K represents an extension factor, and the value depends on the temperature, the polymer, and the nature of the solvent).

<Preparation of Slurry>

To 8 parts by mass of the polymer obtained, 2 parts by mass of Li[TFSI] as an electrolyte salt, 10 parts by mass of [Py12][TFSI](manufactured by KANTO CHEMICAL CO., INC., melting point: 90° C.) as a molten salt, and 24 parts by mass of acetone as a dispersion medium were added and stirred to obtain a slurry A (slurry for forming an electrode mixture layer). The content of the molten salt in the slurry A was 50% by mass based on the total amount of the polymer, the electrolyte salt, and the molten salt. The mass ratio of the content of the dispersion medium to the content of the polymer in the slurry A was 3. Additionally, to 8 parts by mass of the polymer obtained, 2 parts by mass of Li[TFSI] as an electrolyte salt, 10 parts by mass of [Py12][TFSI] as a molten salt, and 16 parts by mass of acetone as a dispersion medium were added and stirred to obtain a slurry B (slurry for forming an electrolyte sheet).

<Production of Electrolyte Sheet>

The slurry B was dropped onto an SUS plate of which diameter was 16 mm and dried at 40° C. for two hours to vaporize acetone. Thereafter, drying was carried out at 60° C. under a reduced pressure of $1.0\times10^4$ Pa or less (0.1 atmospheres or less) for 10 hours to obtain an electrolyte sheet of which thickness is 400 μm.

Example 1-1

<Production of Positive Electrode>

The slurry A was added to the positive electrode active material layer of the positive electrode precursor produced above by applying the slurry A thereon by a doctor blade method with a gap of 200 μm. Thereafter, the volatile component was removed by repeating pressure reduction of 0.05 MPa and opening into the atmosphere 10 times using a vacuum desiccator to prepare a positive electrode mixture layer, and a positive electrode comprising a positive electrode mixture layer was obtained.

<Production of Negative Electrode>

The slurry A was added to the negative electrode active material layer of the negative electrode precursor produced above by applying the slurry A thereon by a doctor blade method with a gap of 200 μm. Thereafter, the volatile component was removed by repeating pressure reduction of 0.05 MPa and opening into the atmosphere 10 times using a vacuum desiccator to prepare a negative electrode mixture layer, and a negative electrode comprising a negative electrode mixture layer was obtained.

<Production of Electrolyte Layer>

The slurry B was applied on the positive electrode mixture layer of the positive electrode obtained by a doctor blade method with a gap of 250 μm. A positive electrode having an electrolyte layer of 30 μm in thickness on the positive electrode mixture layer was obtained by repeating pressure reduction of 0.05 MPa and opening into the atmosphere 10 times using a vacuum desiccator and vacuum drying the slurry B at 60° C. for 12 hours. Similarly, obtained was a negative electrode having an electrolyte layer of 30 μm in thickness on the negative electrode mixture layer of the negative electrode.

<Production of Secondary Battery>

The positive electrode and the negative electrode each having the electrolyte layer produced above were punched out to a diameter of 15 mm for producing a coin-type battery. The positive electrode and the negative electrode were layered such that the electrolyte layers were brought into contact with each other, and placed in a CR2032-type coin cell case. The layered product obtained was sealed by crimping the top of the battery case via an insulating gasket to obtain a secondary battery of Example 1. It should be noted that production of the battery was performed in a glove box under an argon atmosphere.

[Analysis by Scanning Electron Microscope]

With respect to the positive electrode produced in Example 1, distribution of cobalt and sulfur by energy dispersive X-ray analysis (EDX) was analyzed using a scanning electron microscope (SEM). The analysis results are shown in FIG. 7.

FIG. 7(a) is a cross sectional image of a certain portion of the positive electrode produced in Example 1, imaged with a scanning electron microscope (SEM). As shown in FIG. 7(a), the positive electrode comprises a positive electrode current collector 30 and a positive electrode mixture layer 20 provided on at least one principal surface of the positive electrode current collector 30. The results of surface analysis (element mapping) on the area shown in FIG. 7(a) are shown in FIGS. 7(b) and 7(c). The surface analysis was performed by energy dispersive X-ray analysis (SEM-EDX) attached to the SEM. The dimmed (white) area in FIG. 7(b) is an area where cobalt is present. The cobalt is derived from Li($Co_{1/3}Ni_{1/3}Mn_{1/3}$)$O_2$ as the positive electrode active material. The dimmed (white) area in FIG. 7(c) is an area where sulfur is present. The sulfur is derived from [TFSI] of [P(DADMA)][TFSI], Li[TFSI] and [Py12][TFSI]. As shown in FIG. 7(c), it is suggested that the components such as the polymer is uniformly dispersed in the positive electrode material and that an interface has been formed between the components such as the polymer and the positive electrode material.

[Evaluation of Battery Performance]

The secondary battery produced by the method described above was used to evaluate battery performance. A charge and discharge device (TOYO SYSTEM CO., LTD., trade name: TOSCAT-3200) was used to conduct charge and discharge measurement at 50° C. and 0.05 C. It should be noted that C means "Current value [A]/designed theoretical capacity [Ah]" and 1 C represents a current value in full charge or full discharge of the battery in an hour. The results are shown in Table 1. It can be said that the larger the discharge capacity value is, the more excellent the battery characteristics is.

Comparative Example 1-1

<Production of Secondary Battery>

The positive electrode precursor, the electrolyte sheet, and the negative electrode precursor produced above were layered in this order such that the positive electrode active material layer and the negative electrode active material layer were brought into contact with the electrolyte sheet, and placed in a CR2032-type coin cell case. The layered product obtained was sealed by crimping the top of the battery case via an insulating gasket to obtain a secondary battery of Comparative Example 1. It should be noted that production of the battery was performed in a glove box under an argon atmosphere. With the respect to the secondary battery obtained, the battery performance was evaluated in the same manner as in Example 1. The results are shown in Table 1.

TABLE 1

| Items | Charge capacity [mAh/g] | Discharge capacity [mAh/g] |
| --- | --- | --- |
| Example 1-1 | 142 | 142 |
| Comparative Example 1-1 | 92 | 77 |

Figure 8:
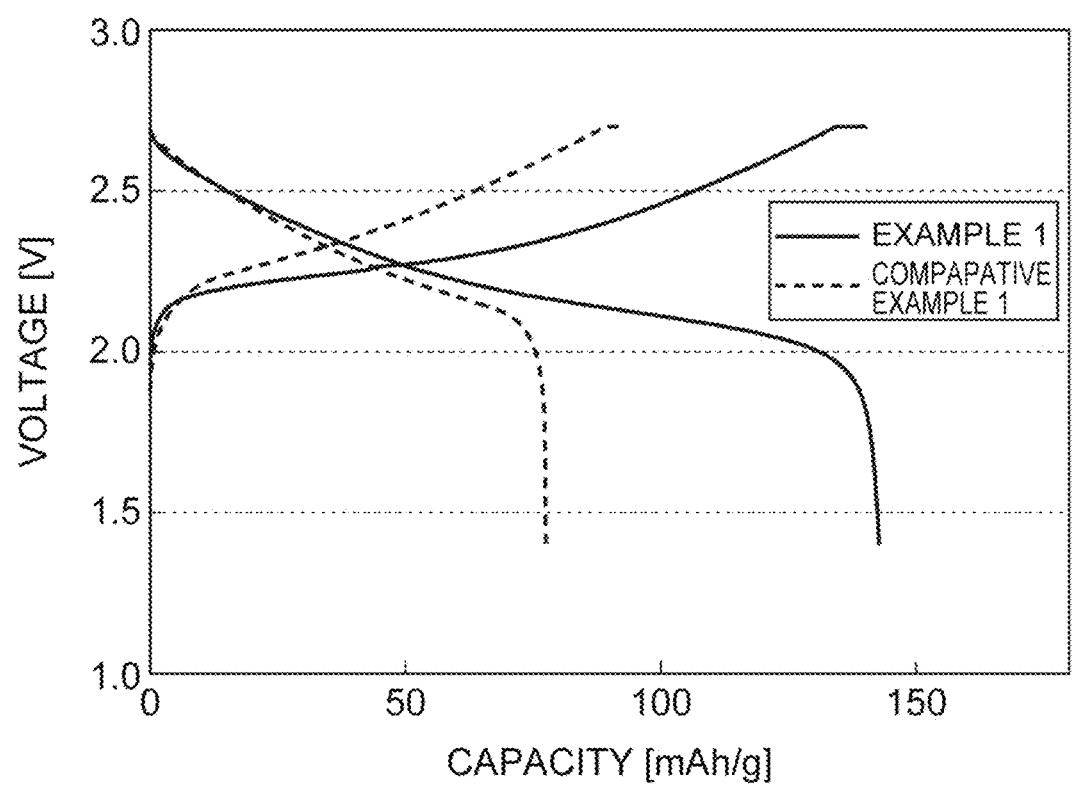
FIG. 8 is a graph showing evaluation of battery performance of secondary batteries produced in Example 1-1 and Comparative Example 1-1.

FIG. 8 is a graph showing the evaluation of the battery performance of the secondary batteries produced in Example 1 and Comparative Example 1. It was found that the secondary battery of Example 1, of which discharge capacity is about twice that of the secondary battery of Comparative Example 1, is excellent in the battery characteristics. From these results, it was confirmed that the electrochemical device electrode of the present invention can improve the battery characteristics even when the battery is produced with addition of a solid electrolyte to an electrode mixture layer.

2. Production and Evaluation of Secondary Battery-2

[Production of Electrode for Secondary Battery and Secondary Battery]

<Production of Positive Electrode Precursor>

Mixed were 66 parts by mass of Li($Co_{1/3}Ni_{1/3}Mn_{1/3}$)$O_2$ (positive electrode active material), 4 parts by mass of acetylene black (conductive agent, trade name: Li400, average particle size 48 nm (manufacturer catalog value), Denka Company Limited), 14 parts by mass of a polyvinylidene fluoride solution (binder, trade name: Kureha KF Polymer #1120, solid content 12% by mass, KUREHA CORPORATION), and 15 parts by mass of N-methyl-2-pyrrolidone (dispersion medium, NMP) to prepare a slurry for forming a positive electrode active material layer. This slurry for forming a positive electrode active material layer was applied on a principal surface of a positive electrode current collector (an aluminum foil of which thickness is 20 µm) and dried at 120° C. Then, rolling was conducted to form a positive electrode active material layer in which the amount applied on one surface was 120 g/m² and the mixture density was 2.7 g/cm³, and a positive electrode precursor was produced.

<Production of Negative Electrode Precursor>

Mixed were 52 parts by mass of graphite (negative electrode active material), 0.4 parts by mass of carbon nanotubes (conductive agent, trade name: VGCF, fiber diameter 150 nm (manufacturer catalog value), Showa Denko K. K.), 1.4 parts by mass of highly pure graphite (conductive agent, trade name: JSP, average particle size 7 µm (manufacturer catalog value), Nippon Graphite Industries, Co., Ltd.), 21.8 parts by mass of a polyvinylidene fluoride solution (binder, trade name: Kureha KF Polymer #9130, solid content 13% by mass, KUREHA CORPORATION), and 24.4 parts by mass of N-methyl-2-pyrrolidone (dispersion medium, NMP) to prepare a slurry for forming a negative electrode active material layer. This slurry for forming a negative electrode active material layer was applied on a principal surface of a negative electrode current collector (a copper foil of which thickness is 10 µm) and dried at 80° C. Then, rolling was conducted to form a negative electrode active material layer in which the amount applied on one surface was 60 g/m² and the mixture density was 1.6 g/cm³, and a negative electrode precursor was produced.

<Synthesis of Polymer [P(DADMA)] [FSI]>

[P(DADMA)][FSI] was synthesized in the same manner as in the synthesis of the polymer [P(DADMA)][TFSI] described above except that Li[FSI] was used instead of Li[TFSI].

<Preparation of Slurry>

[P(DADMA)][TFSI] or [P(DADMA)][FSI] synthesized above as a polymer, Li[FSI] as an electrolyte salt, [Py13][FSI] (manufactured by KANTO CHEMICAL CO., INC.) or [EMI][FSI] (manufactured by KANTO CHEMICAL CO., INC.) as a molten salt, and acetone as a dispersion medium, in parts by mass shown in Table 2, were stirred to prepare slurries C to G (slurries for forming an electrode mixture layer).

TABLE 2

| Items | Polymer | | Electrolyte salt | Molten salt | |
|---|---|---|---|---|---|
| | [P(DADMA)] [TFSI] | [P(DADMA)] [FSI] | Li[FSI] | [Py13] [FSI] | [EMI] [FSI] |
| Slurry C | 24 | — | 18 | 58 | — |
| Slurry D | 24 | — | 14 | 62 | — |
| Slurry E | 24 | — | 23 | 53 | — |
| Slurry F | 16 | — | 14 | — | 70 |
| Slurry G | — | 16 | 14 | — | 70 |

TABLE 2-continued

| Items | Dispersion medium Acetone | Mass ratio (dispersion medium/ polymer) |
|---|---|---|
| Slurry C | 72 | 3 |
| Slurry D | 72 | 3 |
| Slurry E | 72 | 3 |
| Slurry F | 48 | 3 |
| Slurry G | 48 | 3 |

<Production of Electrolyte Sheet>

An ionic liquid solution of Li[TFSI] was prepared by using Li[TFSI] as an electrolyte salt and dissolving Li[TFSI] in [DEME][TFSI] as an ionic liquid such that the concentration of the electrolyte salt reached 1.5 mol/L. Mixed were 43 parts by mass of the ionic liquid solution obtained, 23 parts by mass of $SiO_2$ particles, 34 parts by mass of a binder (trade name: Kureha KF polymer #8500, KUREHA CORPORATION), and 143 parts by mass of NMP to prepare a slurry for forming an electrolyte sheet. This slurry for forming an electrolyte sheet was applied on a principal surface of a supporting film and dried at 80° C. to produce an electrolyte sheet of which thickness is 20 µm. To produce a secondary battery, the electrolyte sheet obtained was punched into a disc.

Example 2-1

<Production of Positive Electrode and Negative Electrode>

The slurry C was added to the positive electrode active material layer of the positive electrode precursor and the negative electrode active material layer of the negative electrode precursor produced above by applying the slurry C thereon by a doctor blade method with a gap of 150 µm. Thereafter, the volatile component (dispersion medium) was removed by vacuum drying the slurry C at 60° C. for 12 hours to produce a positive electrode mixture layer and a negative electrode mixture layer, and a positive electrode comprising the positive electrode mixture layer and a negative electrode comprising the negative electrode mixture layer were obtained. To produce a secondary battery, the positive electrode and the negative electrode obtained were each punched into a disc.

<Production of Secondary Battery>

The positive electrode, the electrolyte sheet, and the negative electrode that were each punched into a disc were layered in this order and placed in a CR2032-type coin cell case. The layered product obtained was sealed by crimping the top of the battery case via an insulating gasket to obtain a secondary battery of Example 2-1.

Example 2-2

A secondary battery of Example 2-2 was obtained in the same manner as in Example 2-1 except that the slurry C was replaced by the slurry D.

Example 2-3

A secondary battery of Example 2-3 was obtained in the same manner as in Example 2-1 except that the slurry C was replaced by the slurry E.

Example 2-4

A secondary battery of Example 2-4 was obtained in the same manner as in Example 2-1 except that the slurry C was replaced by the slurry F.

Example 2-5

A secondary battery of Example 2-5 was obtained in the same manner as in Example 2-1 except that the slurry C was replaced by the slurry G.

Comparative Example 2-1

A secondary battery of Comparative Example 2-1 was obtained in the same manner as Example 2-1 except that the slurry C was not applied on the positive electrode active material layer of the positive electrode precursor and the negative electrode active material layer of the negative electrode precursor.

[Evaluation of Battery Performance]

The secondary batteries of Examples 2-1 to 2-5 and Comparative Example 2-1 produced by the above methods were used to evaluate battery performance. A charge and discharge device (TOYO SYSTEM CO., LTD., trade name: TOSCAT-3200) was used to measure charge and discharge capacities at 25° C. under the following charge and discharge conditions. The results are shown in Table 3. It can be said that the larger the discharge capacity value is, the more excellent the battery characteristics is.

(1) After constant-current and constant-voltage (CCCV) charging was performed at a termination voltage of 4.2 V and 0.05 C, one cycle of constant-current (CC) discharging at 0.05 C to a termination voltage of 2.7 V was performed, and the charge capacity and the discharge capacity at 0.05 C were determined. It should be noted that C means "Current value [A]/designed theoretical capacity [Ah]" and 1 C represents a current value in full charge or full discharge of the battery in an hour.

(2) Then, after constant-current and constant-voltage (CCCV) charging was performed at a termination voltage of 4.2 V and 0.05 C, one cycle of constant-current (CC) discharging at 0.2 C to a termination voltage of 2.7 V was performed, and the discharge capacity at 0.2 C was determined.

(3) Subsequently, after constant-current and constant-voltage (CCCV) charging was performed at a termination voltage of 4.2 V and 0.05 C, one cycle of constant-current (CC) discharging at 0.5 C to a termination voltage of 2.7 V was performed, and the discharge capacity at 0.5 C was determined.

TABLE 3

| Items | 0.05 C Charge capacity [mAh/g] | 0.05 C Discharge capacity [mAh/g] | 0.2 C Discharge capacity [mAh/g] | 0.5 C Discharge capacity [mAh/g] |
|---|---|---|---|---|
| Example 2-1 | 135 | 131 | 123 | 23 |
| Example 2-2 | 145 | 132 | 105 | 16 |
| Example 2-3 | 132 | 128 | 80 | 21 |
| Example 2-4 | 136 | 130 | 122 | 115 |
| Example 2-5 | 136 | 131 | 128 | 119 |
| Comparative Example 2-1 | 0 | 0 | — | — |

It was found that the secondary batteries of Examples 2-1 to 2-5 are excellent in the battery characteristics relative to the secondary battery of Comparative Example 2-1. From these results, it was confirmed that the electrochemical device electrode of the present invention can improve the battery characteristics even when the battery is produced with addition of a solid electrolyte to an electrode mixture layer.

3. Production and Evaluation of Secondary Battery-3

[Production of Electrode for Secondary Battery and Secondary Battery]

<Production of Positive Electrode Precursor>

Mixed were 66 parts by mass of $Li(Co_{1/3}Ni_{1/3}Mn_{1/3})O_2$ (positive electrode active material), 4 parts by mass of acetylene black (conductive agent, trade name: Li400, average particle size 48 nm (manufacturer catalog value), Denka Company Limited), 14 parts by mass of a polyvinylidene fluoride solution (binder, trade name: Kureha KF Polymer #1120, solid content 12% by mass, KUREHA CORPORATION), and 15 parts by mass of N-methyl-2-pyrrolidone (dispersion medium, NMP) to prepare a slurry for forming a positive electrode active material layer. This slurry for forming a positive electrode active material layer was applied on a principal surface of a positive electrode current collector (an aluminum foil of which thickness is 20 μm) and dried at 120° C. Then, rolling was conducted to form a positive electrode active material layer in which the amount applied on one surface was 120 g/m² and the mixture density was 2.7 g/cm³, and a positive electrode precursor was produced. Thereafter, the electrode was machined for producing a laminate-type cell.

<Production of Negative Electrode Precursor>

Mixed were 52 parts by mass of graphite (negative electrode active material), 0.4 parts by mass of carbon nanotubes (conductive agent, trade name: VGCF, fiber diameter 150 nm (manufacturer catalog value), Showa Denko K. K.), 1.4 parts by mass of highly pure graphite (conductive agent, trade name: JSP, average particle size 7 μm (manufacturer catalog value), Nippon Graphite Industries, Co., Ltd.), 21.8 parts by mass of a polyvinylidene fluoride solution (binder, trade name: Kureha KF Polymer #9130, solid content 13% by mass, KUREHA CORPORATION), and 24.4 parts by mass of N-methyl-2-pyrrolidone (dispersion medium, NMP) to prepare a slurry for forming a negative electrode active material layer. This slurry for forming a negative electrode active material layer was applied on a principal surface of a negative electrode current collector (a copper foil of which thickness is 10 μm) and dried at 80° C. Then, rolling was conducted to form a negative electrode active material layer in which the amount applied on one surface was 60 g/m² and the mixture density was 1.6 g/cm³, and a negative electrode precursor was produced. Thereafter, the electrode was machined for producing a laminate-type cell.

<Preparation of Slurry>

[P(DADMA)][TFSI] synthesized above as a polymer, Li[FSI] as an electrolyte salt, [EMI][FSI] (manufactured by KANTO CHEMICAL CO., INC.) as a molten salt, and acetone as a dispersion medium, in parts by mass shown in Table 4, were stirred to prepare slurries H to K (slurries for forming electrode mixture layer).

TABLE 4

| Items | Polymer [P(DADMA)] [TFSI] | Electrolyte salt Li[FSI] | Molten salt [EMI] [FSI] | Dispersion medium Acetone | Mass ratio (dispersion medium/ polymer) |
|---|---|---|---|---|---|
| Slurry H | 16 | 14 | 70 | 32 | 2 |
| Slurry I | 16 | 14 | 70 | 80 | 5 |
| Slurry J | 16 | 14 | 70 | 128 | 8 |
| Slurry K | 16 | 14 | 70 | 160 | 10 |

<Production of Electrolyte Sheet>

An ionic liquid solution of Li[FSI] was prepared by using Li[FSI] as an electrolyte salt and dissolving Li[FSI] in [Py13][FSI] as an ionic liquid such that the concentration of the electrolyte salt reached 1.5 mol/L. Mixed were 43 parts by mass of the ionic liquid solution obtained, 23 parts by mass of $SiO_2$ particles, 34 parts by mass of a binder (trade name: Kureha KF polymer #8500, KUREHA CORPORATION), and 143 parts by mass of NMP to prepare a slurry for forming an electrolyte sheet. This slurry for forming an electrolyte sheet was applied on a principal surface of a supporting film and dried at 80° C. to produce an electrolyte sheet of which thickness is 20 μm.

Example 3-1

<Production of Positive Electrode and Negative Electrode>

The slurry H was added to the positive electrode active material layer of the positive electrode precursor and the negative electrode active material layer of the negative electrode precursor produced above by applying the slurry H thereon by a doctor blade method with a gap of 150 μm. Thereafter, the volatile component (dispersion medium) was removed by vacuum drying the slurry H at 60° C. for 12 hours to produce a positive electrode mixture layer and a negative electrode mixture layer, and a positive electrode comprising the positive electrode mixture layer and a negative electrode comprising the negative electrode mixture layer were obtained.

<Production of Secondary Battery>

The positive electrode, the electrolyte sheet, and the negative electrode were layered in this order to produce a laminate-type cell, and the secondary battery of Example 3-1 was obtained.

Example 3-2

A secondary battery of Example 3-2 was obtained in the same manner as in Example 3-1 except that the slurry H was replaced by the slurry I.

Example 3-3

A secondary battery of Example 3-3 was obtained in the same manner as in Example 3-1 except that the slurry H was replaced by the slurry J.

Example 3-4

A secondary battery of Example 3-4 was obtained in the same manner as in Example 3-1 except that the slurry H was replaced by the slurry K.

[Evaluation of Battery Performance]

The secondary batteries of Example 3-1 to 3-4 produced by the above methods were used to evaluate battery performance. With respect to charge and discharge capacities at 25° C., a charge and discharge device (TOYO SYSTEM CO., LTD., trade name: TOSCAT-3200) was used to conduct charge and discharge measurement at 5° C. and 0.05 C. After constant-current and constant-voltage (CCCV) charging was performed at a termination voltage of 4.2 V and 0.05 C, one cycle of constant-current (CC) discharging at 0.05 C to a termination voltage of 2.7 V was performed to determine the discharge capacity. It should be noted that C means "Current value [A]/battery capacity [Ah]". The results are shown in Table 5. It can be said that the larger the discharge capacity value is, the more excellent the battery characteristics is.

TABLE 5

| Items | 0.05 C Discharge capacity [mAh/g] |
|---|---|
| Example 3-1 | 133 |
| Example 3-2 | 127 |
| Example 3-3 | 113 |
| Example 3-4 | 97 |

[Analysis by Scanning Electron Microscope]

With respect to the positive electrodes produced in Examples 3-1 to 3-4, the cross sections of the secondary batteries were analyzed using a scanning electron microscope (SEM). The analysis results are shown in FIG. 9 and FIG. 10.

FIGS. 9(a) and 9(b) and FIGS. 10(a) and 10(b) each are a portion of the positive electrode produced in Examples 3-1 to 3-4, imaged with the scanning electron microscope (SEM). As shown in FIG. 9 and FIG. 10, the positive electrode comprises a positive electrode current collector 30 and a positive electrode mixture layer 20 provided on at least one principal surface of the positive electrode current collector 30. From the comparison between the cross sectional images shown in FIG. 9 and the cross sectional images shown in FIG. 10, it was observed that as acetone used in the slurry is reduced, the polymer filling of the positive electrode mixture layer tends to increase.

All the secondary batteries of Examples 3-1 to 3-4 were excellent in the battery characteristics. From these results, it was confirmed that the electrochemical device electrode of the present invention can improve the battery characteristics even when the battery is produced with addition of a solid electrolyte to an electrode mixture layer. Meanwhile, it was suggested that as the mass ratio of the content of the dispersion medium to the content of the polymer is decreased, it is possible to fill the positive electrode mixture layer with the polymer more sufficiently and a better ionic conductivity tends to be obtained.

INDUSTRIAL APPLICABILITY

According to the present invention, an electrochemical device electrode, which is capable of improving the battery characteristics even when a battery is produced with addition of a solid electrolyte to an electrode mixture layer and a production method therefor are provided. Also, according to the present invention, an electrochemical device in which such an electrochemical device electrode is employed is provided. Further, according to the present invention, a polymer electrolyte composition capable of improving the ionic conductivity of an electrode mixture layer is provided.

REFERENCE SIGNS LIST

1 . . . secondary battery, 2, 2A, 2B . . . electrode group, 3 . . . battery outer packaging, 4 . . . positive electrode collector tab, 5 . . . negative electrode collector tab, 6 . . . positive electrode, 7 . . . electrolyte layer, 8 . . . negative electrode, 9, 30 . . . positive electrode current collector, 10, 20 . . . positive electrode mixture layer, 11 . . . negative electrode current collector, 12 . . . negative electrode mixture layer, 13A, 13B . . . first electrochemical device electrode, 14A, 14B . . . second electrochemical device electrode, 15 . . . bipolar electrode, 16 . . . bipolar electrode current collector, 17A, 17B . . . third electrochemical device electrode.

The invention claimed is:

1. An electrochemical device electrode comprising:
an electrode current collector; and
an electrode mixture layer provided on at least one principal surface of the electrode current collector, wherein
the electrode mixture layer comprises:
an electrode active material;
a polymer having a structural unit represented by the following formula (1):

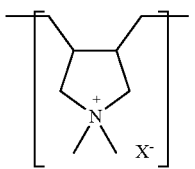

(1)

wherein X⁻ represents a counter anion;
at least one electrolyte salt selected from the group consisting of lithium salts, sodium salts, calcium salts, and magnesium salts; and
a molten salt having a melting point of 250° C. or less, the molten salt comprising 1-ethyl-3-methylimidazolium bis(fluorosulfonyl)imide,
wherein
the electrochemical device electrode is a negative electrode,
the electrode current collector is a negative electrode current collector, the electrode mixture layer is a negative electrode mixture layer, and the electrode active material is a negative electrode active material.

2. The electrochemical device electrode according to claim 1, wherein the at least one electrolyte salt comprises at least one anion selected from the group consisting of $PF_6^-$, $BF_4^-$, $N(FSO_2)_2^-$, $N(CF_3SO_2)_2^-$, $B(C_2O_4)_2^-$, and $ClO_4^-$.

3. The electrochemical device electrode according to claim 1, wherein the at least one electrolyte salt comprises a lithium salt.

4. The electrochemical device electrode according to claim 1, wherein a content of the molten salt is 10 to 80% by mass based on a total amount of the polymer, the at least one electrolyte salt, and the molten salt.

5. The electrochemical device electrode according to claim 1, wherein the negative electrode active material comprises graphite.

6. The electrochemical device electrode according to claim 1, wherein the at least one electrolyte salt comprises $LiN(FSO_2)_2$.

7. An electrochemical device comprising the electrochemical device electrode according to claim 1.

8. A method for producing an electrochemical device electrode, the method comprising:
providing an electrode precursor in which an electrode active material layer comprising an electrode active material is provided on at least one principal surface of an electrode current collector;
adding a slurry to the electrode active material layer of the electrode precursor, the slurry comprising:
a polymer having a structural unit represented by the following formula (1)

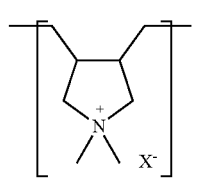

(1)

wherein X⁻ represents a counter anion;
at least one electrolyte salt selected from the group consisting of lithium salts, sodium salts, calcium salts, and magnesium salts;
a molten salt having a melting point of 250° C. or less, the molten salt comprising 1-ethyl-3-methylimidazolium bis(fluorosulfonyl)imide; and
a dispersion medium; and
removing a volatile component from the slurry added to the electrode active material layer to form an electrode mixture layer.

9. The method for producing an electrochemical device electrode according to claim 8, wherein the at least one electrolyte salt comprises at least one anion selected from the group consisting of $PF_6^-$, $BF_4^-$, $N(FSO_2)_2^-$, $N(CF_3SO_2)_2^-$, $B(C_2O_4)_2^-$, and $ClO_4^-$.

10. The method for producing an electrochemical device electrode according to claim 8, wherein a content of the molten salt is 10 to 80% by mass based on a total amount of the polymer, the at least one electrolyte salt, and the molten salt.

11. The method for producing an electrochemical device electrode according to claim 8, wherein the dispersion medium comprises acetone.

12. The method for producing an electrochemical device electrode according to claim 8, wherein a mass ratio of a content of the dispersion medium to a content of the polymer is 6 or less.

* * * * *